(12) United States Patent
Jin et al.

(10) Patent No.: US 9,131,340 B2
(45) Date of Patent: Sep. 8, 2015

(54) LOCATION UPDATE PROCESSING METHOD AND DEVICE

(71) Applicant: Huawei Device Co., LTD, Shenzhen (CN)

(72) Inventors: Hui Jin, Beijing (CN); Chenliang Gao, Beijing (CN)

(73) Assignee: Huawei Device Co., Ltd, Shenzhen (CN)

( * ) Notice: Subject to any disclaimer, the term of this patent is extended or adjusted under 35 U.S.C. 154(b) by 75 days.

(21) Appl. No.: 14/039,650

(22) Filed: Sep. 27, 2013

(65) Prior Publication Data

US 2014/0024368 A1   Jan. 23, 2014

Related U.S. Application Data

(63) Continuation of application No. PCT/CN2012/072776, filed on Mar. 22, 2012.

(30) Foreign Application Priority Data

Apr. 2, 2011 (CN) .......................... 2011 1 0084225

(51) Int. Cl.
*H04W 4/00* (2009.01)
*H04W 8/02* (2009.01)
(Continued)

(52) U.S. Cl.
CPC ................ *H04W 8/02* (2013.01); *H04W 60/00* (2013.01); *H04W 8/06* (2013.01)

(58) Field of Classification Search
CPC ........... H04W 8/02; H04W 8/04; H04W 8/06; H04W 60/00; H04W 60/005
USPC ....................................... 455/433, 434, 435.1
See application file for complete search history.

(56) References Cited

U.S. PATENT DOCUMENTS

| 7,782,818 B2* | 8/2010 | Hurtta et al. ................. 370/331 |
| 2011/0098020 A1* | 4/2011 | Van Loon et al. ............ 455/411 |
| 2011/0269468 A1* | 11/2011 | Sundell et al. ............... 455/436 |

FOREIGN PATENT DOCUMENTS

| CN | 1206542 A | 1/1999 |
| CN | 101448297 A | 6/2009 |

(Continued)

OTHER PUBLICATIONS

"3rd Generation Partnership Project; Technical Specification Group Services and System Aspects; General Packet Radio Service (GPRS); Service description; Stage 2 (Release 10)," 3GPP TS 23.060, V10.3. 0, Technical Specification, Mar. 2011, 320 pages.

(Continued)

*Primary Examiner* — Wayne Cai
(74) *Attorney, Agent, or Firm* — Slater & Matsil, L.L.P.

(57) ABSTRACT

A method includes, when a UE enters a first core network device and performs a location update, determining, by the first core network device and at least according to that a timer does not time out, that context information of the UE is available, and sending, by the first core network device, to a second core network device, a location update request that includes information that the context information of the UE is available. The method further includes executing, by the first core network device, the location update at least according to saved context information of the UE. The timer is sent to the first core network device by the second core network device before the UE enters the first core network device and when the UE leaves the first core network device and performs the location update. Alternatively, the timer is saved in the first core network device in advance.

17 Claims, 10 Drawing Sheets

(51) Int. Cl.
*H04W 60/00* (2009.01)
*H04W 8/06* (2009.01)

(56) References Cited

FOREIGN PATENT DOCUMENTS

| CN | 101771996 A | 7/2010 |
| CN | 101873570 A | 10/2010 |
| CN | 101888675 A | 11/2010 |
| CN | 101938807 A | 1/2011 |
| WO | 2009139675 A1 | 11/2009 |

OTHER PUBLICATIONS

Chinese Office Action received in Application No. 201110084225.6, with partial English translation, mailed May 5, 2014, 14 pages.

International Search Report and Written Opinion of the International Searching Authority received in Patent Cooperation Treaty Application No. PCT/CN2012/072776, with English translation, mailed Jul. 12, 2012, 21 pages.

* cited by examiner

LOCATION UPDATE PROCESSING METHOD AND DEVICE

CROSS-REFERENCE TO RELATED APPLICATIONS

This application is a continuation of International Application No. PCT/CN2012/072776, filed on Mar. 22, 2012, which claims priority to Chinese Patent Application No. CN 201110084225.6, filed on Apr. 2, 2011, both of which are hereby incorporated herein by reference in their entirety.

TECHNICAL FIELD

Embodiments of the present invention relate to the field of communications technologies, and in particular, to a location update processing method and device.

BACKGROUND

With the development of technologies, 3G technologies have already been widely applied, such as WCDMA (Wideband Code Division Multiple Access), CDMA2000 (Code Division Multiple Access 2000) and TD-SCDMA (Time Division-Synchronous Code Division Multiple Access).

However, 2G networks have been constructed for a long time, so coverage of the 2G networks is better than coverage of 3G networks, and this phenomenon will not change in the short term. Therefore, most of current 3G terminals are 2G/3G dual-mode mobile phones supporting a 2G network and a 3G network simultaneously, such as a WCDMA/GSM (Global System of Mobile communication) dual-mode mobile phone, and a TD-SCDMA/GSM dual-mode mobile phone.

Generally, an existing 2G/3G dual-mode terminal preferably camps in a 3G network, and when a coverage problem occurs in the 3G network, the terminal reselects or is handed over to a 2G network, and when the 3G network is restored to normality, the terminal reselects or is handed back over to the 3G network. That is, the terminal performs a location update between the 2G network and the 3G network. However, a process in which the terminal frequently performs location updates will cause frequent access to a network element (such as a home subscriber server (HSS) or home location register (HLR)) of a core network, which results in overload of the network element of the core network.

SUMMARY OF THE INVENTION

Embodiments of the present invention provide a location update processing method and device, so as to reduce a load of a network element of a core network.

In an aspect, a location update processing method is provided for embodiments in which a user equipment (UE) enters a first core network device and performs a location update. The method includes determining, by the first core network device, and at least according to that a timer does not time out, that context information of the UE is available, and sending, by the first core network device, to a second core network device, a location update request. The location update request at least includes information that the context information of the UE is available. The method further includes executing, by the first core network device, a location update at least according to saved context information of the UE. The timer is sent to the first core network device by the second core network device before the UE enters the first core network device and when the UE leaves the first core network device and performs a location update. Alternatively, the timer is saved in the first core network device in advance.

In another aspect, a location update processing method is further provided. The method includes sending to the first core network device, by a second core network device, a timer or instruction information used for starting a timer, when a UE leaves a first core network device and performs a location update. Once the UE enters the first core network device again and performs a location update, the first core network device determines whether context information of the UE is available. When the first core network device determines context information of the UE is available, at least according to that the timer does not time out, the first core network device sends, to the second core network device, a location update request that at least includes information that the context information of the UE is available. The first core network device also executes a location update at least according to saved context information of the UE. The method further includes not sending, by the second core network device, subscription data of the UE to the first core network device, at least according to the information that the context information of the UE is available and that is included in the received location update request.

In another aspect, a first core network device is further provided. The device includes a radio frequency transceiver, a memory, and at least one processor. The processor is coupled to the radio frequency transceiver and the memory. When a UE enters the first core network device and performs a location update, and when it is determined that context information of the UE is available at least according to that a timer does not time out, the processor is configured to trigger the radio frequency transceiver to send, to a second core network device, a location update request that at least includes information that the context information of the UE is available. The processor is further configured to execute the location update at least according to context information of the UE saved in the memory. The timer is sent to the first core network device by the second core network device before the UE enters the first core network device and when the UE leaves the first core network device and performs a location update. Alternatively, the timer is saved in the first core network device in advance.

In another aspect, a second core network device is further provided. The second core network devices includes a radio frequency transceiver and at least one processor. The processor is coupled to the radio frequency transceiver. When a UE leaves a first core network device and performs a location update, the radio frequency transceiver is configured to send, to the first core network device, a timer or instruction information used for starting a timer. When the UE enters the first core network device again and performs a location update, the first core network device determines whether context information of the UE is available at least according to that the timer does not time out. When the first core network device determines context information of the UE is available, the first core network device sends, to the second core network device, a location update request that at least includes information that the context information of the UE is available and executes a location update at least according to saved context information of the UE. The processor is configured not to send subscription data of the UE to the first core network device, at least according to the information that the context information of the UE is available and that is included in the received location update request.

In the location update processing method and device provided in embodiments of the present invention, when the UE enters the first core network device and performs a location update, and after the first core network device determines that the context information of the UE is available according to that the timer that is sent by the second core network device or saved in advance does not time out, the first core network device may execute a location update according to the saved context information of the UE. Therefore, the first core network device sends to the second core network device the location update request that includes the information that the context information of the UE is available, so that the second core network device is not required to send the subscription data of the UE to the first core network device anymore, thereby reducing the amount of data sent by the second core network device and reducing a load of the second core network device.

BRIEF DESCRIPTION OF THE DRAWINGS

To describe the technical solutions in embodiments of the present invention more clearly, the following briefly introduces accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of embodiments of the present invention more comprehensible, the following clearly describes the technical solutions in embodiments of the present invention with reference to the accompanying drawings in embodiments of the present invention. The described embodiments are merely a part rather than all of embodiments of the present invention. All other embodiments obtained by persons of ordinary skill in the art based on embodiments of the present invention without creative efforts shall fall within the protection scope of the present invention.

Figure 1:
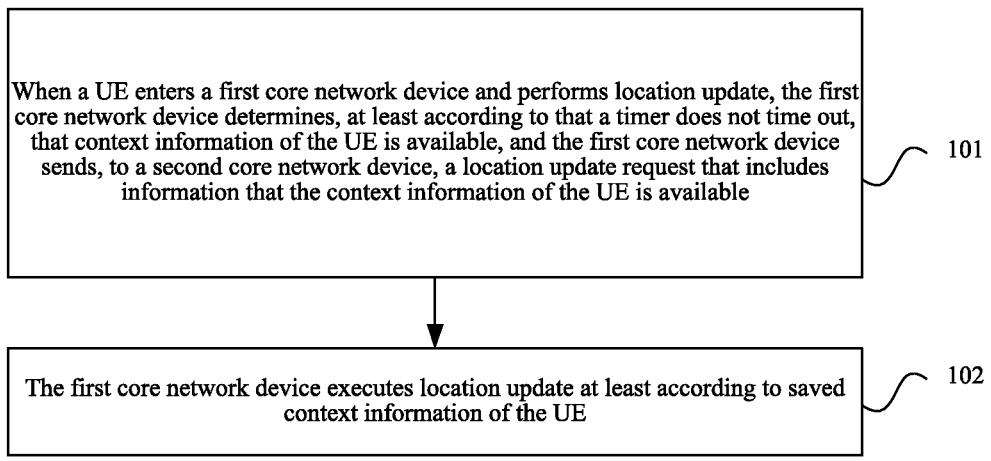
FIG. 1 is a flow chart of a first embodiment of a location update processing method of the present invention.

FIG. 1 is a flow chart of a first embodiment of a location update processing method of the present invention. As shown in FIG. 1, the method includes the following steps.

Step 101: When a UE enters a first core network device and performs a location update, the first core network device determines, at least according to that a timer does not time out, that context information of the UE is available. The first core network device sends, to a second core network device, a location update request that includes information that the context information of the UE is available.

The timer is sent to the first core network device by the second core network device before the UE enters the first core network device and when the UE leaves the first core network device and performs a location update. Alternatively, the timer is saved in the first core network device in advance.

An embodiment of the present invention may be applied to a scenario that the UE performs a location update. The location update performed by the UE may include the following process: 1. The UE performs a location update between SGSNs (Serving GPRS Support Node) and/or between MSCs (Mobile Switching Centers) in a 2G (second generation) network or 3G (3rd-generation) network; 2. location update of the UE between a 2G network and a 3G network includes a location update between SGSNs and/or a location update between MSCs; 3. the UE performs an inter-MME (Mobility Management Entity) location update in an EPS (Evolved Packet System) network; 4. A location update of the UE between a 3G network and an EPS network or a location update of the UE between a 2G network and an EPS network includes a location update between an SGSN and an MME.

Under different application scenarios, the first core network device in this embodiment corresponds to different network elements. For example, when the UE performs a location update in the 2G network or 3G network or the UE performs a location update between the 2G network and a 3G network, the first core network device may be an SGSN, and in this case, the context information of the UE may specifically be an MM (Mobility Management) context and a PDP (Packet Data Protocol) context. Alternatively, the first core network device may be an MSC. When the UE performs the inter-MME location update, the first core network device may be an MME, and in this case, the context information of the UE may specifically be an MM context and an EPS Bearer (Evolved Packet System Bearer) context. When the UE performs the location update between the 3G network and the EPS network or the UE performs the location update between the 2G network and the EPS network, the first core network device may be an MME or SGSN. In this embodiment, when the first core network device is an SGSN or MSC, the second core network device may be an HLR (Home Location Register). When the first core network device is an MME, the second core network device may be an HSS (Home Subscriber Server).

The foregoing timer is specifically illustrated below.

First, a situation that the timer is sent by the second core network device to the first core network device is described now.

When the UE leaves the first core network device, that is, when the UE performs an update from the first core network device to another core network device, the first core network device receives the timer sent by the second core network device. Then the first core network device may first not delete originally saved context information of the UE at least according to the timer, but delete the context information of the UE after the timer times out, which may specifically be at the same time when the first core network device receives the timer or after the first core network device receives the timer. The first core network device starts the timer to begin to record time, and after the timer times out, the first core network device then deletes the context information of the UE.

The timer may be dynamically generated by the second core network device at least according to a network state and/or load of the second core network device, or the timer may also be preconfigured to the second core network device, and then be sent by the second core network device to the first core network device.

Specifically, the foregoing network state may include the following. The UE frequently executes location updates, or, after a fault occurs in a 3G or 4G core network element (SGSN/MSC/MME), a large number of UEs execute location updates, where the process of executing location update may include reselection between different RATs (Radio Access Technology) (inter RAT reselection) or reselection between same RATs (intra RAT reselection). The reselection between different RATs means that the UE performs a location update between 2G and 3G, the UE performs a location update between 2G and EPS, or the UE performs a location update between 3G and EPS. The reselection between same RATs means that the UE performs a location update between SGSNs or MSCs inside 2G, the UE performs a location update between SGSNs or MSCs inside 3G, or the UE performs a location update between MMEs inside EPS.

Second a situation in which the timer is saved in the first core network device in advance is described as follows.

The timer is saved in the first core network device in advance or sent to the first core network device in advance. Then, at the same time when or after the first core network device receives instruction information sent by the second core network device, the first core network device starts the timer. Then, the first core network device may first not delete originally saved context information of the UE according to the timer, but deletes the context information of the UE after the timer times out.

An operation executed by the first core network device in this step is specifically described below.

After the UE performs a location update and leaves the first core network device, the UE may enter the first core network device again when performing other location updates. When the UE enters the first core network device again, the first core network device receives a location update request sent by the UE or another network element. For example, when the first core network device is an SGSN or MME, the first core network device may receive a location update request sent by the UE. When the first core network device is an MSC, the first core network device may receive a location update request sent by an SGSN. When the UE enters the first core network device again, the first core network device may determine whether the timer times out, that is, determine whether the context information of the UE in the first core network device is available. If the timer does not time out, the first core network device may perform a location update at least according to the saved context information of the UE and is not required to generate the context information of the UE again according to the subscription data of the UE sent by the second core network device. Therefore, the second core network device is not required to send the subscription data of the UE to the first core network device. If the timer times out, the context information of the UE is not saved in the first core network device, that is, the context information of the UE is not available, and in this case, the second core network device is required to send the subscription data of the UE to the first core network device again, so that the first core network device generates the context information of the UE according to the subscription data of the UE sent by the second core network device, so as to perform a subsequent location update procedure.

If the first core network device determines that the context information of the UE in the first core network device is available, i.e., the timer has not timed out, the location update request sent by the first core network device to the second core network device at least includes the information that the context information of the UE is available, and therefore the second core network device may be notified of a message that the context information of the UE in the first core network device is available. The second core network device may not send the subscription data of the UE to the first core network device at least according to the included information that the context information of the UE is available.

It should be noted that, in this embodiment, the process that the UE enters the first core network device specifically is a process that the UE leaves a third core network device and enters the first core network device, where the third core network device may be a different device according to different application scenarios. For example, when the first core network device is an SGSN, the third core network device may be an SGSN or MME. When the first core network device is an MME, the third core network device may be an MME or SGSN. When the first core network device is an MSC, the third core network device is an MSC. This embodiment may further include, when the second core network device receives the location update request that is sent by the first core network device and includes the information that the context information of the UE is available, the second core network device may send a timer (such as timer2) to the third core network device, where the timer is used for instructing the third core network device not to delete the context information of the UE in a period of time (that is, before timer2 times out). Therefore, if the UE enters the coverage of the third core network device (that is, performing an update to the third core network device) again when the third core network device has not yet deleted the context information of the UE, the context information of the UE in the third core network device is available, so the second core network device is not required to send the subscription data of the UE to the third core network device, thereby reducing the amount of data sent by the second core network device, thereby reducing a load of the second core network device.

Optionally, the location update request that is sent by the first core network device to the second core network device and at least includes the information that the context information of the UE is available may further include acquisition time information of current subscription data of the UE in the first core network device, so that the second core network device determines, according to the acquisition time information, whether the subscription data of the UE changes after the first core network device obtains the subscription data of the UE. If the subscription data of the UE changes, the second core network device determines that subscription data saved in the first core network device is not the latest, and sends the subscription data of the UE to the first core network device. If the subscription data of the UE does not change, the first core network device already has the context information of the UE, so the second core network device is not required to send the subscription data of the UE to the first core network device.

Step 102: The first core network device executes a location update at least according to saved context information of the UE.

The first core network device starts previously saved context information of the UE, and executes a current location update procedure. For a subsequent location update procedure, reference may be made to the prior art.

It should be noted that when the UE performs a location update between 2G networks and/or 3G networks, the UE may first perform a location update between SGSNs, and then perform a location update between MSCs. Where the solution in an embodiment of the present invention may be applied only to the location update between SGSNs, the solution in an embodiment of the present invention may also be applied only to the location update between MSCs, and the solution in an embodiment of the present invention may be further applied to both the location update between SGSNs and the location update between MSCs.

Leaving the first core network device in this embodiment specifically refers to leaving the coverage of the first core network device. That is, the UE leaves an RA (Routing Area), an LA (Location Area) or a TA (Tracing Area) of the first core network device. Entering the first core network device in this embodiment specifically refers to entering the coverage of the first core network device. That is, the UE enters the RA, LA or TA of the first core network device.

In an embodiment of the present invention, when the UE enters the first core network device and performs a location update, and after the first core network device determines that the context information of the UE is available, i.e., the timer that is sent by the second core network device or saved in advance does not time out, the first core network device may execute a location update according to the saved context information of the UE. Therefore, the first core network device sends, to the second core network device, the location update request that includes the information that the context information of the UE is available, so that the second core network device is not required to send the subscription data of the UE to the first core network device anymore, thereby reducing the amount of data sent by the second core network device and reducing a load of the second core network device.

Figure 2:
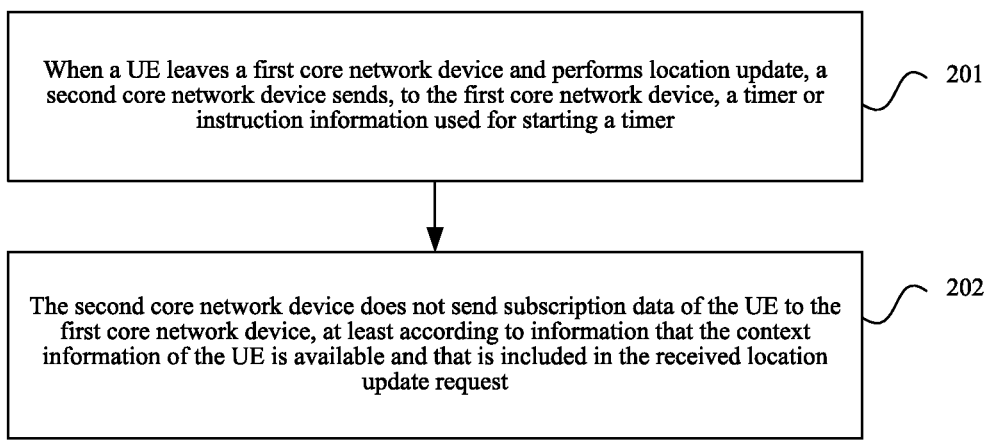
FIG. 2 is a flow chart of a second embodiment of a location update processing method of the present invention.

FIG. 2 is a flow chart of a second embodiment of a location update processing method of the present invention. As shown in FIG. 2, the method includes the following steps.

Step 201: When a UE leaves a first core network device and performs a first location update, a second core network device sends, to the first core network device, a timer or instruction information used for starting a timer, so that when the first core network device determines, when the UE enters the first core network device again and performs a location update, that context information of the UE is available, i.e., that the timer does not time out, the first core network device sends, to the second core network device, a location update request that includes information that the context information of the UE is available and executes a location update at least according to saved context information of the UE.

This embodiment corresponds to the embodiment shown in FIG. 1, and is applied to the same scenario. The first core network device may be an SGSN, and the second core network device may be an HLR. Alternatively, the first core network device may be an MSC, and the second core network device may be an HLR. In the alternative, the first core network device may be an MME, and the second core network device may be an HSS.

When the UE is handed over to another core network device from the first core network device, that is, the UE leaves the first core network device and performs the location update, the second core network device sends, to the first core network device, the timer or the instruction information used for starting a timer, so that the first core network device deletes the context information of the UE after the timer times out. Therefore, if the UE enters the first core network device again before the timer times out, the second core network device is not required to send subscription data of the UE to the first core network device again, and the first core network device may start previously saved context information of the UE and perform the location update.

For detailed illustration of the timer and the instruction information, reference is made to the description of the embodiment shown in FIG. 1. The timer or the instruction information used for starting a timer may be generated by the second core network device at least according to a network state and/or a load state of the second core network device. That is to say, in another specific implementation manner, step 201 may be replaced as follows. When a UE leaves a first core network device and performs a location update, a second core network device generates, at least according to a current network state and/or load state of the second core network device, a timer or instruction information used for starting a timer and sends the timer or the instruction information to the first core network device.

Step 202: The second core network device does not send the subscription data of the UE to the first core network device, at least according to the information that the context information of the UE is available and that is included in the received location update request.

Referring to the specific description in step 101 in the embodiment shown in FIG. 1, when the UE enters the first core network device again and executes a location update, and when determining that the context information of the UE is available, i.e., that the timer has not timed out, the first core network device sends, to the second core network device, the location update request that includes the information that the context information of the UE is available. When the second core network device receives the location update request that includes the information that the context information of the UE is available, the second core network device does not send the subscription data of the UE to the first core network device.

Further, in order to ensure reliability of location update, in another implementation manner, the method provided in this embodiment may further include in step 202, after the second core network device receives the location update request that includes the information that the context information of the UE is available, the second core network device determines again whether the context information of the UE in the first core network device is available (that is, determines whether a first timer times out). If the second core network device determines that the timer does not time out, the second core network device does not send the subscription data of the UE to the first core network device. If the second core network device determines that the timer has timed out, the second core network device sends the subscription data of the UE to the first core network device.

The reason why the second core network device can determine whether the context information of the UE in the first core network device is available is that when the UE leaves from the first core network device, the second core network device instructs the first core network device to begin to record time for whether to delete the context information of the UE, so the second core network device can determine whether the context information of the UE is available. If not available, the second core network device is required to send the subscription data of the UE to the first core network device, so that the first core network device generates the context information of the UE at least according to the subscription data. If not timed out, the second core network device is not required to send the subscription data of the UE to the first core network device.

Optionally, the second core network device internally saves correspondence among the UE, the first core network device and the timer, and the correspondence is used as follows. When the UE enters the first core network device again and performs a location update, the third core network device may determine, according to the correspondence, whether the context information of the UE is still available. A specific determining method includes, when the UE enters the first core network device again and executes a second location update, the third core network device determines, according to an identifier of the UE, whether correspondence between the UE and the first core network device exists. If the correspondence exists, and the timer does not time out, it is indicated that the context information of the UE is still available.

Further, in order to ensure reliability of the location update, in another implementation manner, the method provided in this embodiment may further include in step 202, after the second core network device receives the location update request that includes the information that the context information of the UE is available, the second core network device determines again whether the subscription information of the UE saved in the first core network device is the latest. If the second core network device determines that the subscription information of the UE saved in the first core network device is the latest, the second core network device does not send the subscription data of the UE to the first core network device. If the second core network device determines that the subscription information of the UE saved in the first core network device is not the latest, the second core network device sends the subscription data of the UE to the first core network device.

Optionally, when the UE enters the first core network device again and performs a location update, after the second core network device receives the location update request of the first core network device, the second core network device is further required to determine whether the subscription data saved in the first core network device is the latest. The determining process may be performed before or after the second core network device determines whether the context information of the UE is still available. If the second core network device determines that the subscription data saved in the first core network device is the latest, and that the context information of the UE is still available, the second core network device does not send the subscription data of the UE to the first core network device. If the second core network device determines that the subscription data saved in the first core network device is not the latest, the second core network device is still required to send the subscription data of the UE to the first core network device. Here, that the second core network device determines whether the subscription data saved in the first core network device is the latest specifically includes that the second core network device determines whether the subscription data saved in the first core network device and subscription data saved in the second core network device are the same. If they are the same, the second core network device determines that the subscription data saved in the first core network device is the latest. If they are different, the second core network device determines that the subscription data saved in the first core network device is not the latest.

A specific determining method may include the following two solutions.

In a first solution, when the UE enters the first core network device again and performs a location update, the location update request sent by the first core network device to the second core network device further includes acquisition time information of current subscription data of the UE, and the second core network device determines, according to the acquisition time information, whether the subscription data of the UE changes after the first core network device obtains the subscription data of the UE. If the subscription data of the UE changes, the second core network device determines that the subscription data saved in the first core network device is not the latest and sends the subscription data of the UE to the first core network device.

In a second solution, before the UE enters the first core network device again and performs a location update, if the subscription data of the UE changes, the second core network device saves instruction information that it is required to send the subscription data to the first core network device. When the UE enters the first core network device again and executes the location update, the second core network device may determine, according to the instruction information saved previously, that the subscription data saved in the first core network device is not the latest and sends the subscription data of the UE to the first core network device.

In an embodiment of the present invention, when the UE leaves the first core network device and performs the location update, the second core network device sends, to the first core network device, the timer or the instruction information used for starting a timer, so that the first core network device does not delete the context information of the UE before the timer times out. Then, when the UE enters the first core network device again, the first core network device first determines whether the first timer times out. If not timed out, the first core network device notifies the second core network device of information that the first timer does not time out, so that the second core network device is not required to send the subscription data of the UE to the first core network device again, thereby reducing the amount of data sent by the second core network device and reducing a load of the second core network device.

Figure 3A:
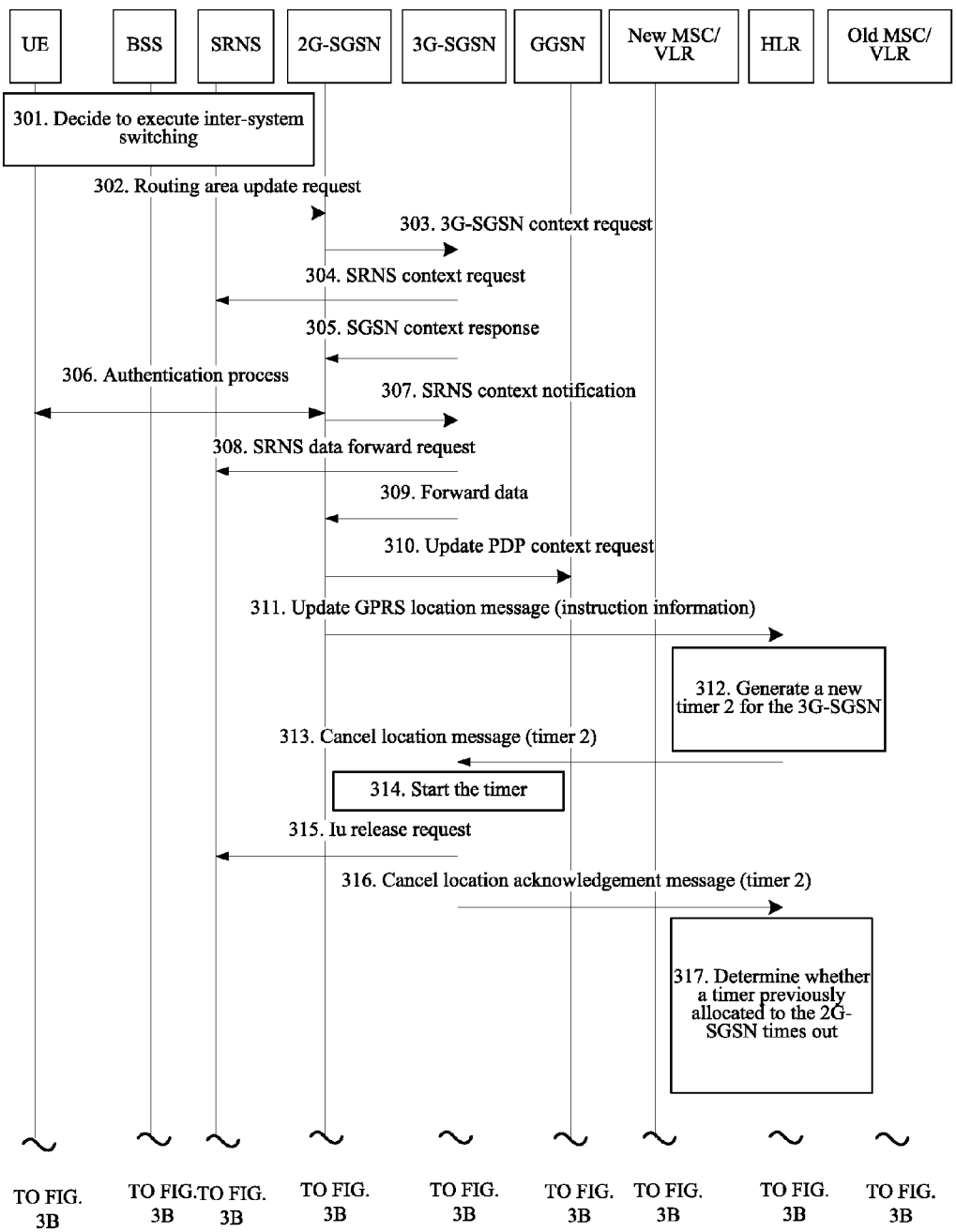
FIG. 3A and FIG. 3B are a signaling diagram of a third embodiment of a location update processing method of the present invention.
Figure 3B:
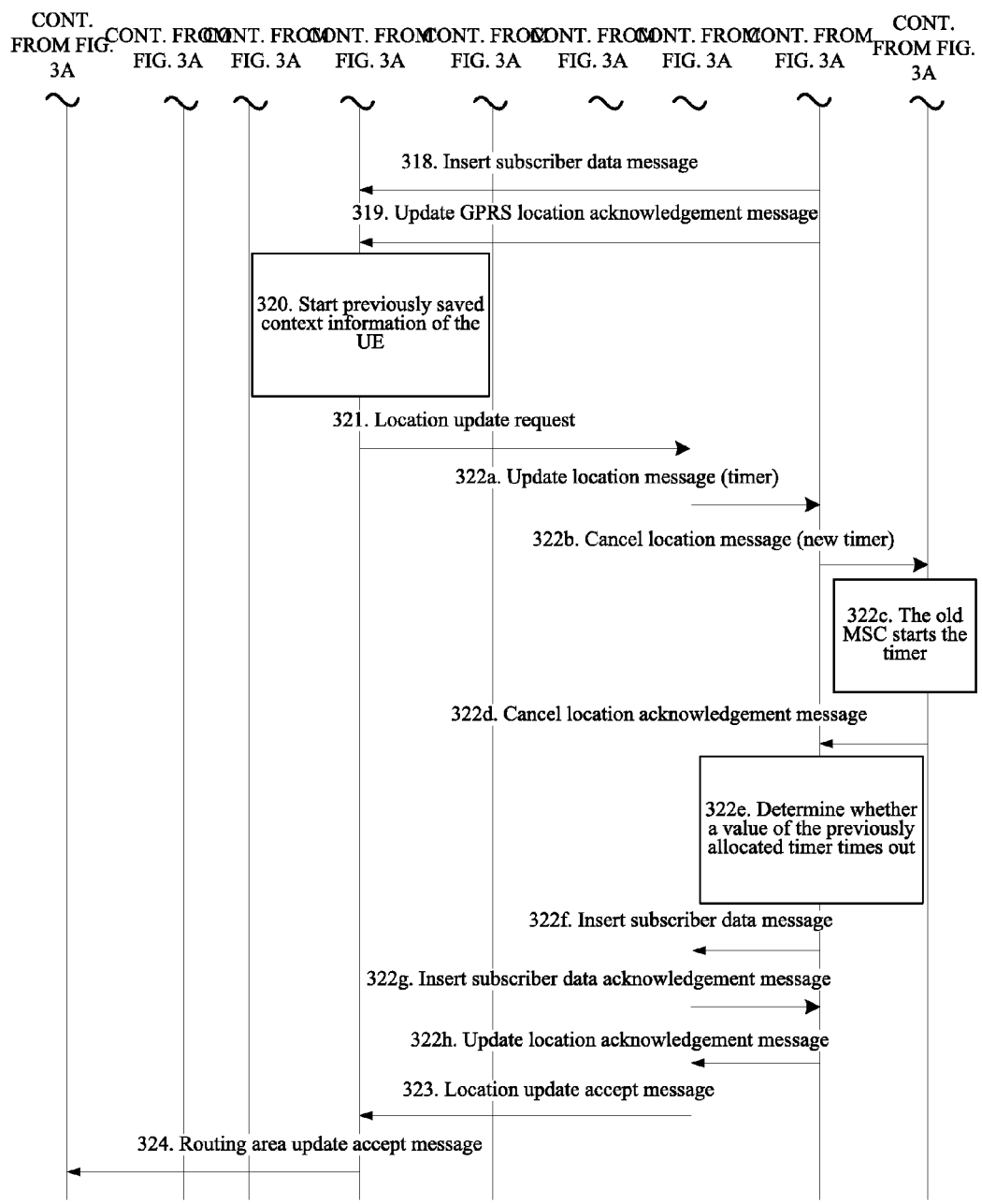

FIG. 3A and FIG. 3B are a signaling diagram of a third embodiment of a location update processing method of the present invention. As shown in FIG. 3A and FIG. 3B, the method includes the following steps.

Step 301: A UE or RAN (Radio Access Network) decides to execute an inter-system handover, to be handed over from a 3G network to a 2G network.

In this embodiment, an update from the 3G network to the 2G network is taken as an example for illustration, and a specific process of another application scenario is similar to the process described in this embodiment. This embodiment is based on the embodiments shown in FIG. 1 and FIG. 2.

Step 302: The UE sends a routing area update request (Routing Area Update Request) to a 2G-SGSN.

This embodiment describes a process of the update from the 3G network to the 2G network. In this embodiment, the 2G-SGSN is an SGSN to which the UE is handed over, and a 3G-SGSN is an SGSN from which the UE is handed over.

Step 303: The 2G-SGSN sends a 3G-SGSN context request (Context Request) to the 3G-SGSN.

Step 304: If the UE is currently transmitting data, the 3G-SGSN sends, to an SRNS (Serving Radio Network Subsystem), an SRNS context request (Context Request) used for informing the SRNS of stopping the sending of data to the UE and of buffering data.

Step 305: The 3G-SGSN replies to the 2G-SGSN with an SGSN context response (Context Response), where context information of the UE (MM Context and PDP Contexts) is transferred in the message.

Step 306: Execute an authentication process.

Step 307: The 2G-SGSN sends an SGSN context notification (Context Acknowledge) message to the 3G-SGSN, to inform the 3G-SGSN that the 2G-SGSN is already prepared to receive data.

Step 308: The 3G-SGSN sends an SRNS data forward request (Data Forward Command) message to the SRNS, and the SRNS sends the buffered data to the 3G-SGSN.

Step 309: The 3G-SGSN forwards the received data to the 2G-SGSN.

Step 310: The 2G-SGSN sends an update PDP context request (Update PDP Context Request) to a GGSN, to perform PDP context update.

Step 311: The 2G-SGSN sends an update GPRS location (Update GPRS Location) message to an HLR, where the message may carry an SGSN number, an SGSN address, an IMSI (International Mobile Subscriber Identity) and instruction information.

The instruction information is information denoting that the context information of the UE is available, may be an instruction that time does not expire, and may also be an instruction that context information is valid. A function of the instruction information is to inform the HLR of a message that the context information of the UE in the 2G-SGSN is available. Specifically, when the UE is handed over from the 2G-SGSN the last time, the HLR instructs the 2G-SGSN to delete the context information of the UE after a certain period of time (such as a timed). The 2G-SGSN may start the timer to begin to record time after receiving the instruction, and if the timer does not time out, that is, the timer 1 does not time out, the 2G-SGSN executes step 311.

Step 312: The HLR generates a new timer2 (that is, a second timer) for the 3G-SGSN according to a current network state and/or load state of the HLR.

Step 313: The HLR sends the newly generated timer2 to the 3G-SGSN through a cancel location (Cancel Location) message.

In this embodiment, that a new timer is dynamically generated is taken as an example for illustration. In another implementation manner, a static timer solution may also be adopted, that is, timer values are statically stored in the HLR and the SGSN, and in this case, step 313 may be replaced with the following. The HLR informs, through the cancel location (Cancel Location) message, the 3G-SGSN of starting the timer, that is, informs the 3G-SGSN of starting the timer, and records time according to the stored timer.

Step 314: The 3G-SGSN starts the timer according to the timer2 received in step 313, and does not delete the context information of the UE (MM context and PDP context) before the timer2 times out.

Step 315: If the UE is currently transmitting data, the 3G-SGSN sends an Iu release request (Release Command) message to the SRNS, so as to release a connection between the 3G-SGSN and the SRNS.

Step 316: The 3G-SGSN replies to the HLR with a cancel location acknowledgement (Cancel Location Ack) message that includes a value of the timer2 received in step 313. This step aims to inform the HLR that the 3G-SGSN supports an enhancement function, and this step is an optional step.

Alternatively, step 316 may be replaced with the following. The 3G-SGSN replies to the HLR with a cancel location response (Cancel Location Ack) message that includes the instruction information that the enhancement is supported.

Step 317: The HLR determines whether a value of a timer allocated to the 2G-SGSN before step 311 times out, and then determines whether it is required to send subscription data to the 2G-SGSN. If not, it may be unnecessary to execute step 318 to step 319, and step 320 is directly executed. If it is required, step 318 to step 319 are executed, and step 320 is not executed.

In step 317, the HLR may not determine whether the value of the timer allocated to the 2G-SGSN times out, but instead, the HLR directly knows, according to an instruction sent by the 2G-SGSN in step 311, whether a timer of the 2G-SGSN times out. However, for reliability of a location update procedure, a process that the HLR performs determination by itself may be added to step 317.

Step 318: The HLR sends an insert subscriber data (Insert Subscriber Data) message to the 2G-SGSN, where the message includes subscription data of the UE.

Step 319: The HLR sends an update GPRS location acknowledgement (Update GPRS Location Ack) message to the 2G-SGSN.

Step 320: The 2G-SGSN starts previously saved context information of the UE (MM Context and PDP Context).

Step 321: The 2G-SGSN sends a location update request (Location Update Request) to a new MSC/VLR (Visitor Location Register).

This embodiment describes the process of the update from the 3G network to the 2G network. In this embodiment, the new MSC/VLR is an MSC/VLR to which the UE is handed over, and an old MSC/VLR is an MSC/VLR from which the UE is handed over. A VLR is used for saving subscription data of a subscriber, and the VLR is generally disposed together with the MSC, so the MSC in each embodiment of the present invention is denoted in an MSC/VLR manner.

The foregoing steps are about an update processing process of the PS domain, and the following is about an update processing process of the CS domain.

Step 322a: The new MSC/VLR sends an update location (Update Location) message to the HLR, where the message carries an instruction that the timer does not expire or an instruction that the context information is valid, and a function of the instruction is to inform the HLR that the new MSC/VLR still saves the context information of the UE.

Step 322b: The HLR generates a new timer for the old MSC/VLR according to the current network state and load state of the HLR, and sends the new timer to the old MSC/VLR through a cancel location (Cancel Location) message.

In this embodiment, that a new timer is dynamically generated is taken as an example for illustration. In another implementation manner, a static timer solution may also be adopted, that is, timer values are statically stored in the HLR and the MSC, and in this case, step 322b may be replaced with the following. The HLR informs, through the cancel location (Cancel Location) message, the 3G-SGSN of starting the timer.

Step 322c: The old MSC/VLR starts the timer at least according to a value of the timer received in step 322b, and does not delete the context information of the UE before the timer times out.

Step 322d: The old MSC/VLR replies with a cancel location acknowledgement (Cancel Location Ack) message, where the message includes the value of the timer received in step 322b, and the step aims to inform the HLR that the old MSC/VLR supports the enhancement function.

A solution of including the value of the timer in this step is optional. Alternatively, this step may be replaced with a step where the old MSC/VLR replies to the HLR with a Cancel Location Ack message that includes the instruction information that the enhancement is supported.

Step 322*e*: The HLR determines whether a value of a timer previously allocated to the new MSC/VLR times out, and then determines whether it is required to send the subscription data to a 2G-MSC. If not, it may be unnecessary to execute step 322*f* and step 322*g*, and step 322*h* is directly executed. If it is required, step 322*f* to step 322*g* are executed, and step 322*h* is not executed.

Step 322*f*: The HLR sends, to the new MSC/VLR, an insert subscriber data (Insert Subscriber Data) message used for inserting the subscription data of the UE into the new MSC/VLR.

Step 322*g*: The new MSC/VLR sends an insert subscriber data acknowledgement (Insert Subscriber Data Ack) message to the HLR.

Step 322*h*: The HLR sends an update location acknowledgement (Update Location Ack) message to the new MSC/VLR.

Step 323: The new MSC/VLR sends a location update accept (Location Update Accept) message to the 2G-SGSN.

Step 324: The 2G-SGSN returns a routing area update accept (Routing Area Update Accept) message to the UE, and then a subsequent step is performed according to an existing procedure.

It should be noted that the solution provided in an embodiment of the present invention may be adopted only in a location update processing process of the PS domain, while an existing processing process is adopted in a location update of the CS domain. Also, the solution provided in an embodiment of the present invention may be adopted only in a location update processing process of the CS domain, while an existing processing process is adopted in a location update of the PS domain. Further, the solution provided in an embodiment of the present invention may be adopted in both the PS domain and the CS domain.

In an embodiment of the present invention, when the UE performs a location update in the 2G network and the 3G network, time for saving the context information of the UE in an old SGSN and/or old MSC is prolonged. When the UE frequently executes a location update (such as: LAU/RAU/TAU), the old MSC/SGSN does not delete the context information of the UE immediately, but reserves the context information of the UE for a period of time, so when the UE is handed back over, it is not required to download the subscription data from the HLR again, thereby reducing the amount of data sent by the HLR and reducing a load of the HLR.

Figure 4:
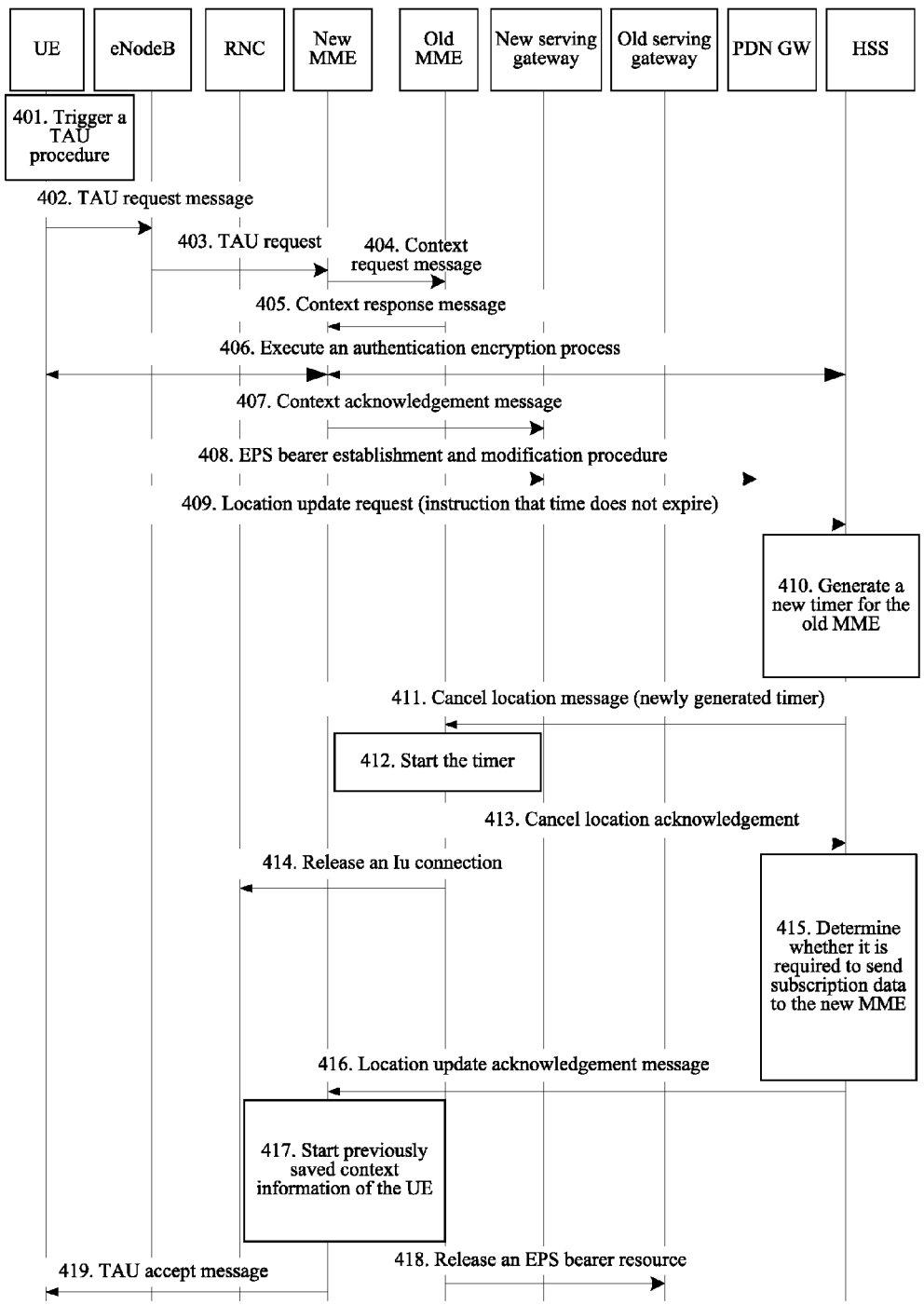
FIG. 4 is a signaling diagram of a fourth embodiment of a location update processing method of the present invention.

FIG. 4 is a signaling diagram of a fourth embodiment of a location update processing method of the present invention. As shown in FIG. 4, the method includes the following steps.

Step 401: A UE triggers event occurrence of a TAU (Tracking Area Update) procedure.

In this embodiment, that the UE performs an inter-MME location update is illustrated, and this embodiment is based on the embodiments shown in FIG. 1 and FIG. 2.

Step 402: The UE initiates a TAU request message to an eNodeB.

Step 403: The eNodeB initiates a TAU request to a new MME.

In this embodiment, the new MME is an MME to which the UE is handed over, and an old MME is an MME from which the UE is handed over.

Step 404: The new MME sends a context request message to an old MME.

Step 405: The old MME returns a context response message, which includes context information (MM context and EPS Bearer Context).

Step 406: Execute an authentication encryption process.

Step 407: The new MME sends a context acknowledgement message to the old MME.

Step 408: The new MME, a new serving gateway and a PDN GW (Packet Data Network Gateway) complete an EPS bearer establishment and modification process.

Step 409: The new MME initiates a location update request to an HSS, where the location update request carries an instruction that time does not expire or an instruction that the context information is valid. A function of the instruction is to inform the HSS that the new MME still saves context information (MM context and EPS Bearer Context) of the UE.

Specifically, when the UE is handed over from the new MME the last time, the HSS instructs the new MME to delete the context information of the UE after a certain time. The new MME may start the timer to begin to record time after receiving the instruction, and if the timer does not time out, the new MME executes step 409.

Step 410: The HSS generates a new timer for the old MME according to a current network state and load state of the HSS.

Step 411: The HSS sends a cancel location message to the old MME, and sends the newly generated timer to the old MME through the cancel location message.

In this embodiment, that a new timer is dynamically generated is taken as an example for illustration. In another implementation manner, a static timer solution may also be adopted, that is, timer values are statically stored in the HSS and the MME, and in this case, step 411 may be replaced with a step where the HSS informs, through the cancel location (Cancel Location) message, the old MME of starting the timer, and recording time according to the stored timer.

Step 412: The old MME starts the timer according to the timer received in step 411, and does not delete the context information of the UE (MM context and EPS bearer context) before the timer times out.

Step 413: The old MME replies to the HSS with a cancel location acknowledgement (Cancel Location Ack) message that includes a value of the timer received in step 411, where this step aims to inform the HSS that the old MME supports the enhancement function, and this step is an optional step.

Optionally, step 413 may be replaced with a step where the old MME replies to the HSS with the cancel location acknowledgement message that includes instruction information that the enhancement function is supported.

Step 414: An old SGSN releases an Iu connection between the old SGSN and an old RNC.

Step 415: The HSS determines, according to a value of a timer previously allocated to the new MME, whether it is required to send the subscription data to the new MME. If yes, the subscription data is included in step 416; otherwise, the subscription data is not included.

Step 416: The HSS sends a location update acknowledgement message to the new MME, where according to the determination in step 415, the message may include the subscription data of the UE, or may not include the subscription data of the UE.

Step 417: The new MME starts previously saved context information of the UE (MM Context and EPS bearer context).

If the context information of the UE saved in the new MME does not time out, the new MME starts the previously saved context information of the UE.

Step 418: The old MME releases an EPS bearer resource between the old MME and an old serving gateway.

Step 419: The new MME sends a TAU accept message to the UE.

In an embodiment of the present invention, when the UE performs a location update between MMEs, time for saving the context information of the UE in the old MME is prolonged. When the UE frequently executes a location update, the old MME does not delete the context information of the UE immediately, but reserves the context information of the UE for a period of time, so when the UE is handed back over, it is not required to download the subscription data from the HSS again, thereby reducing the amount of data sent by the HSS and reducing a load of the HSS.

Figure 5:
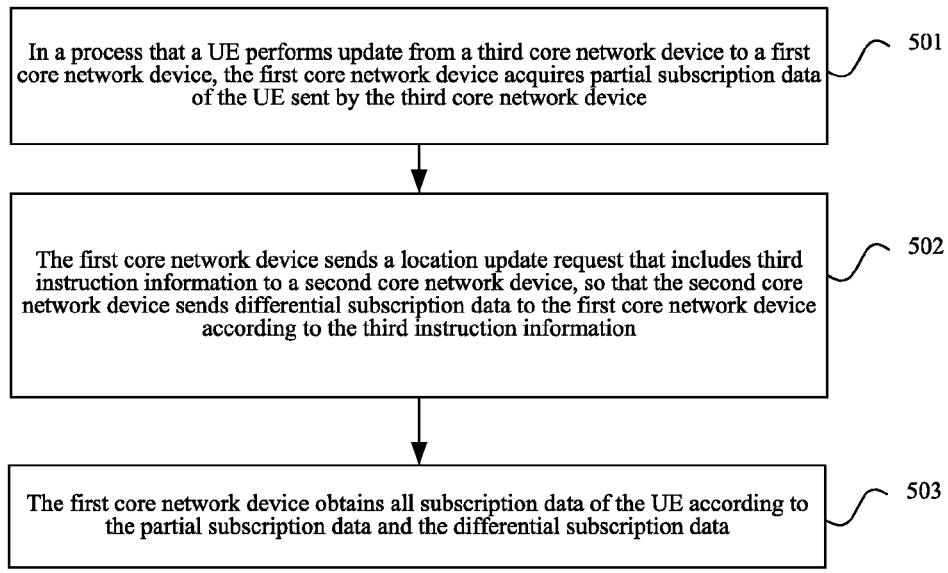
FIG. 5 is a flow chart of a fifth embodiment of a location update processing method of the present invention.

FIG. 5 is a flow chart of a fifth embodiment of a location update processing method of the present invention. As shown in FIG. 5, the method includes the following steps.

Step 501: In a process that a UE performs an update from a third core network device to a first core network device, the first core network device acquires partial subscription data of the UE sent by the third core network device.

An embodiment of the present invention may be applied to a scenario that the UE performs a location update. The location update performed by the UE may include the following process: 1. the UE performs a location update in a 2G network or 3G network, between SGSNs and/or between MSCs; 2. a location update of the UE between a 2G network and a 3G network includes a location update between SGSNs and/or a location update between MSCs; 3. the UE performs an inter-MME location update in an EPS network; 4. a location update of the UE between a 3G network and an EPS network or a location update of the UE between a 2G network and an EPS network includes a location update between an SGSN and an MME.

Under different application scenarios, the first core network device and the third core network device in this embodiment correspond to different network elements. For example, when the UE performs a location update in the 2G network or the 3G network or between the 2G network and the 3G network, the first core network device and the third core network device may be an SGSN after update and an SGSN before update, respectively, or the first core network device and the third core network device may be an MSC after update and an MSC before update, respectively. When the UE performs the inter-MME location update, the first core network device and the third core network device may be an MME after update and an MME before update, respectively. When the UE performs the location update between the 3G network and the EPS network or the UE performs the location update between the 2G network and the EPS network, the first core network device and the third core network device may be an MME after update and an SGSN before update, respectively, or the first core network device and the third core network device may be an SGSN after update and an MME before update, respectively.

When the UE performs the location update in the 2G network or the 3G network or between the 2G network and the 3G network, the UE may first perform a PS domain location update between SGSNs, and then perform a CS domain location update between MSCs. When the UE performs a PS domain location update between SGSNs, a new SGSN (that is, an SGSN to which the UE is handed over) may acquire partial subscription data of the UE from an old SGSN (that is, an SGSN from which the UE is handed over). In order that a new MSC may first receive partial subscription data of the UE at the time of performing the CS domain location update between MSCs, after the new SGSN acquires all subscription data of the PS domain of the UE, the new SGSN may acquire common subscription data of the PS domain and the CS domain from all the subscription data of the PS domain, and then the common subscription data is sent to the new MSC, so that the new MSC may receive partial subscription data of the UE sent by the new SGSN (partial subscription data of the CS domain of the UE). When a location update is performed from the SGSN to the MME, the MME may acquire partial subscription data of the UE from the SGSN. When a location update is performed from the MME to the SGSN, the SGSN may acquire partial subscription data of the UE from the MME.

When the first core network device and the third core network device are an SGSN after update and an SGSN before update, respectively, or when the first core network device and the third core network device are an MME after update and an MME before update, respectively, or when the first core network device and the third core network device are an MME after update and an SGSN before update, respectively, or when the first core network device and the third core network device are an SGSN after update and an MME before update, respectively, the first core network device may receive context information of the UE sent by the third core network device, and then may obtain partial subscription data from the context information. Specifically, when the third core network device is an SGSN, the context information is specifically an MM context and a PDP context. When the third core network device is an MME, the context information is specifically an MM context and an EPS Bearer context. When the first core network device and the third core network device are an MSC after update and an MSC before update, respectively, the first core network device may receive the common subscription data of the CS domain and the PS domain sent by the SGSN, that is, partial subscription data of the UE. Moreover, further, when the first core network device is an SGSN after update, the first core network device sends the common subscription data of the CS domain and the PS domain to an MSC where an update is to be performed, after the first core network device obtains all the subscription data of the UE.

Step 502: The first core network device sends a location update request that includes third instruction information to a second core network device, so that the second core network device sends differential subscription data to the first core network device according to the third instruction information, where the differential subscription data is subscription data other than the partial subscription data. The third instruction information is used for indicating that the first core network device has obtained the partial subscription data of the UE.

The first core network device already acquires the partial subscription data of the UE, and informs, through the third instruction information, the second core network device of the partial subscription data of the UE acquired by the first core network device, so the second core network device may only send the differential subscription data other than the partial subscription data to the first core network device. In this way, the amount of data sent by the second core network device can be reduced, and a load of the second core network device can be reduced.

When the first core network device and the third core network device are SGSNs or MSCs, the second core network device may be an HLR. When the first core network device and the third core network device are MMEs, the second core network device may be an HSS. When the first core network device is an SGSN, and the third core network device is an MME, the second core network device may be an HSS. When the first core network device is an MME, and the third core network device is an SGSN, the second core network device may be an HSS.

Step 503: The first core network device obtains all the subscription data of the UE according to the partial subscription data and the differential subscription data.

The first core network device may obtain all the subscription data of the UE according to the previously received partial subscription data and the differential subscription data sent by the second core network device. Then, the first core network device performs a subsequent location update procedure according to all the subscription data of the UE.

In an embodiment of the present invention, in the process that the UE performs the update from the third core network device to the first core network device, the first core network device first acquires the partial subscription data of the UE, and then the first core network device sends the instruction information to the second core network device, so that the second core network device only sends the differential subscription data other than the partial subscription data to the first core network device. Then, the first core network device may obtain all the subscription data of the UE according to the partial subscription data and the differential subscription data. The second core network device is only required to send the differential subscription data of the UE to the first core network device, and is not required to send all the subscription data, so in this embodiment, the amount of data sent by the second core network device can be reduced and the load of the second core network device can be reduced.

Figure 6:
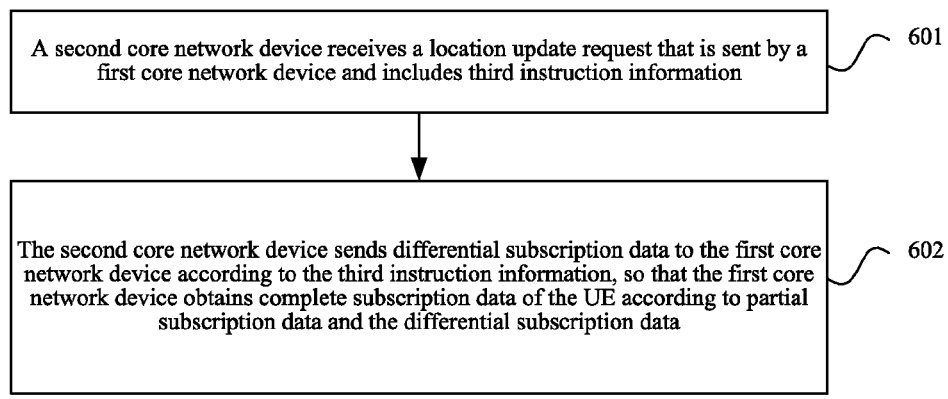
FIG. 6 is a flow chart of a sixth embodiment of a location update processing method of the present invention.

FIG. 6 is a flow chart of a sixth embodiment of a location update processing method of the present invention. As shown in FIG. 6, the method includes the following steps.

Step 601: A second core network device receives a location update request that is sent by a first core network device and includes third instruction information. The third instruction information is used for indicating that the first core network device has obtained partial subscription data of a UE. The location update request is sent after the first core network device acquires the partial subscription data of the UE in a process that the UE performs an update from a third core network device to the first core network device.

This embodiment corresponds to the embodiment shown in FIG. 5, and is applied to the same scenario. Referring to the description in step 501 and step 502 in the embodiment shown in FIG. 5, after acquiring the partial subscription data of the UE, the first core network device may send a third location update request that includes the third instruction information to the second core network device.

Step 602: The second core network device sends differential subscription data to the first core network device according to the third instruction information, so that the first core network device obtains all subscription data of the UE according to the partial subscription data and the differential subscription data, where the differential subscription data is subscription data other than the partial subscription data.

The second core network device may know, according to the instruction information sent by the first core network device, which partial subscription data is already acquired by the first core network device, and then the second core network device sends subscription data not existing in the first core network device (that is, the differential subscription data) to the first core network device. After receiving the differential subscription data, the first core network device may obtain all the subscription data of the UE according to the previously received partial subscription data and the differential subscription data, and then performs a subsequent location update procedure according to all the subscription data.

Further, in order to ensure reliability of a location update, in another implementation manner, the method provided in this embodiment may further include the following.

The second core network device determines, according to the third location update request and a previous record, whether the first core network device has obtained partial subscription data of the UE. If the first core network device has obtained partial subscription data of the UE, step 602 is executed; if the first core network device has not obtained partial subscription data of the UE, the second core network device sends all the subscription data of the UE to the first core network device.

In an embodiment of the present invention, in the process that the UE performs the update from the third core network device to the first core network device, the first core network device first acquires the partial subscription data of the UE, and then the first core network device sends the instruction information to the second core network device, so that the second core network device only sends the differential subscription data other than the partial subscription data to the first core network device. Then, the first core network device may obtain all the subscription data of the UE according to the partial subscription data and the differential subscription data. The second core network device is only required to send the differential subscription data of the UE to the first core network device, and is not required to send all the subscription data, so in this embodiment, the amount of data sent by the second core network device can be reduced and a load of the second core network device can be reduced.

Figure 7:
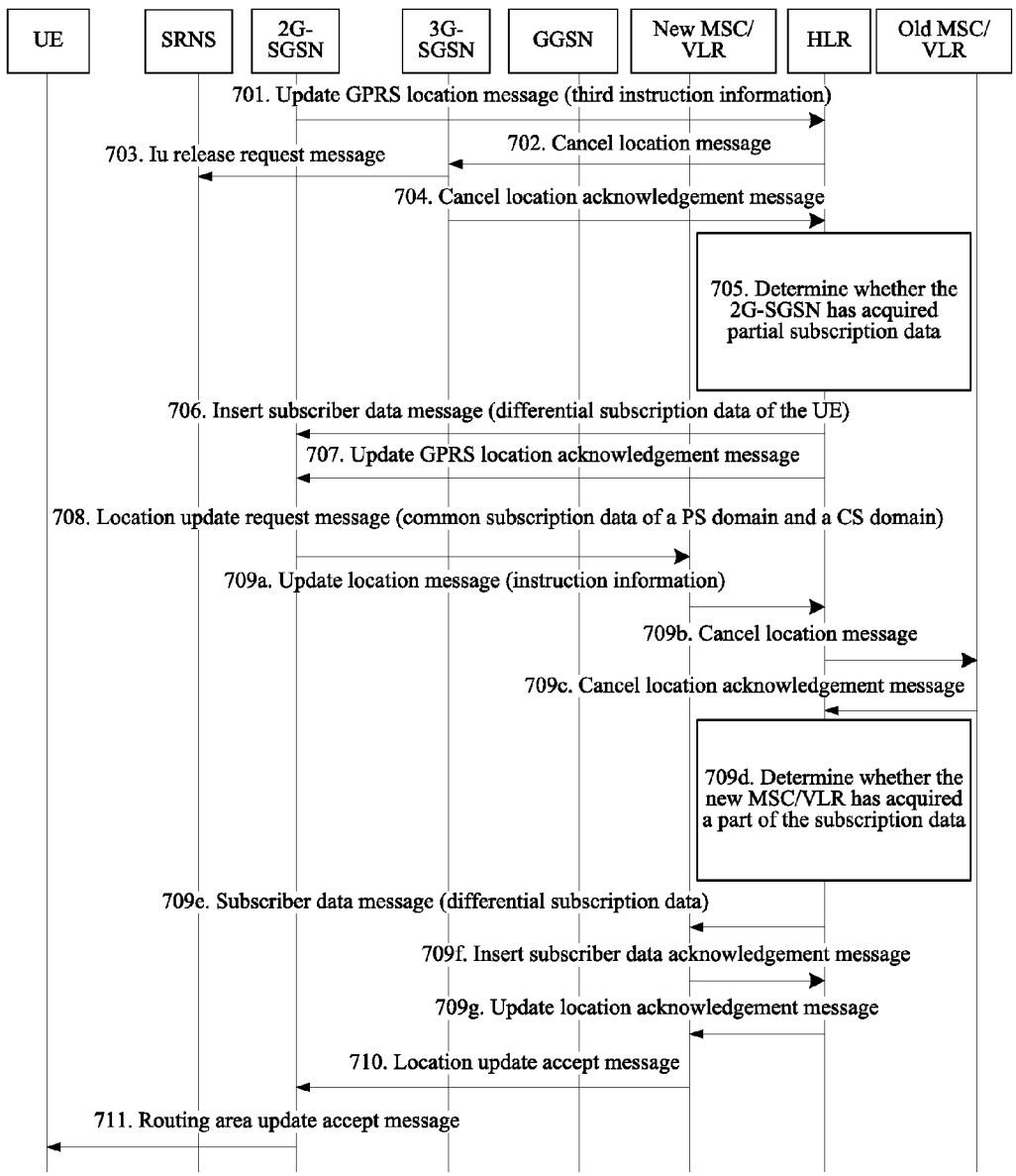
FIG. 7 is a signaling diagram of a seventh embodiment of a location update processing method of the present invention.

FIG. 7 is a signaling diagram of a seventh embodiment of a location update processing method of the present invention. As shown in FIG. 7, the method includes the following steps.

Step 701: A 2G-SGSN sends an update GPRS location message to an HLR, where the message may carry an SGSN Number, an SGSN Address, an IMSI and third instruction information.

In this embodiment, an update from a 3G network to a 2G network is taken as an example for illustration, and other update processes are similar to the process described in this embodiment. This embodiment is based on the embodiments shown in FIG. 5 and FIG. 6. Before step 701, this embodiment may include step 301 to step 310 in the embodiment shown in FIG. 3A and FIG. 3B, which are not described again.

The third instruction information may aim to inform the HLR that the 2G-SGSN supports an enhancement function in this embodiment, that is, the 2G-SGSN may combine previously obtained partial subscription data and subsequently received differential subscription data into all the subscription data. The partial subscription data previously obtained by the 2G-SGSN is the context information of the UE sent by the 3G-SGSN to the 2G-SGSN in step 305.

It should be noted that if the 2G-SGSN and the HLR are in the same network, the HLR may have known that the 2G-SGSN supports the enhancement function in this embodiment, and the third instruction information may also not be sent. If the UE is in a roaming state, that is, the 2G-SGSN and the HLR are in different networks, the third instruction information has to be sent.

Step 702: The HLR sends a cancel location (Cancel Location) message to the 3G-SGSN, to inform the 3G-SGSN of deleting an MM context and a PDP context.

Step 703: If the UE is currently transmitting data, the 3G-SGSN sends an Iu release request message to the SRNS, so as to release a connection between the 3G-SGSN and the SRNS.

Step 704: The 3G-SGSN returns a cancel location acknowledgement message to the HLR.

Step 705: The HLR determines, according to the instruction information provided by the 2G-SGSN in step 701, whether the 2G-SGSN has acquired partial subscription data, and if yes, generates differential subscription data (that is, subscription data other than subscription data obtained by the SGSN).

In step 705, the HLR may not determine whether the 2G-SGSN has acquired partial subscription data, but instead, the HLR directly knows, according to the instruction sent by the 2G-SGSN in step 701, that the 2G-SGSN has acquired partial subscription data. However, for reliability of the location update procedure, a process that the HLR performs determination by itself may be added to step 705.

Step 706: The HLR sends an insert subscriber data (Insert Subscriber Data) message to the 2G-SGSN, where the message includes the differential subscription data of the UE.

Step 707: The HLR sends an update GPRS location acknowledgement message to the 2G-SGSN.

Step 708: The 2G-SGSN acquires common subscription data of a PS domain and a CS domain according to acquired subscription data of the PS domain and sends the common subscription data to a new MSC/VLR through a location update request (Location Update Request) message.

The common subscription data of the PS domain and the CS domain may for example include information such as Access Restriction Data and Closed Subscriber Group Information. For details, reference may be made to the description in the prior art.

The foregoing steps are about update processing processes of the PS domain, and the following is about update processing processes of the CS domain.

Step 709a: The new MSC/VLR sends an update location (Update Location) message to the HLR, where the update location message includes instruction information. The instruction information may aim to inform the HLR that the new MSC/VLR supports the enhancement function in this embodiment. That is, the new MSC/VLR may combine the previously obtained partial subscription data and the subsequently received differential subscription data into all the subscription data. The partial subscription data previously obtained by the new MSC/VLR refers to the common subscription data of the PS domain and the CS domain sent by the 2G-SGSN to the new MSC/VLR in step 708.

It should be noted that if the new MSC/VLR and the HLR are in the same network, the HLR may have known that the new MSC/VLR supports the enhancement function in this embodiment, and the instruction information may also not be sent. If the UE is in the roaming state, that is, the new MSC/VLR and the HLR are in different networks, the instruction information has to be sent.

This embodiment describes a process of the update from the 3G network to the 2G network. In this embodiment, the new MSC/VLR is an MSC/VLR to which the UE is handed over, and the old MSC/VLR is an MSC/VLR from which the UE is handed over.

Step 709b: The HLR sends a cancel location (Cancel Location) message to an old MSC/VLR, to inform the old MSC/VLR of deleting the subscription data of the UE.

Step 709c: The old MSC/VLR replies to the HLR with a cancel location acknowledgement message.

Step 709d: The HLR determines, according to the instruction information provided by the new MSC/VLR in step 709a, whether the new MSC/VLR has acquired partial subscription data, and if yes, generates differential subscription data (that is, subscription data other than subscription data obtained by the new MSC/VLR). This step is optional, and the HLR may directly know, according to the instruction information provided in step 709a, that the new MSC/VLR has acquired partial subscription data, and is not required to perform an additional determination.

Step 709e: The HLR sends the differential subscription data to the new MSC/VLR through an insert subscriber data (Insert Subscriber Data) message.

Step 709f: The new MSC/VLR sends an insert subscriber data acknowledgement (Insert Subscriber Data Ack) message to the HLR.

Step 709g: The HLR sends an update location acknowledgement (Update Location Ack) message to the new MSC/VLR.

Step 710: The new MSC/VLR sends a location update accept (Location Update Accept) message to the 2G-SGSN.

Step 711: The 2G-SGSN returns a routing area update accept (Routing Area Update Accept) message to the UE, and then a subsequent step is performed according to an existing procedure.

It should be noted that the solution provided in an embodiment of the present invention may be adopted only in a location update processing process of the PS domain, while an existing processing process is adopted in a location update of the CS domain. Also, the solution provided in an embodiment of the present invention may be adopted only in an location update processing process of the CS domain, while an existing processing process is adopted in the location update of the PS domain. Further, the solution provided in an embodiment of the present invention may be adopted in both the PS domain and the CS domain.

In this embodiment, at the time of performing location update, the new SGSN or the new MSC may separately obtain partial subscription data from the old SGSN or the new SGSN, and therefore the HLR is only required to send differential subscription data to the new SGSN or the new MSC and is not required to send the complete subscription data, thereby reducing the amount of data sent by the HLR and reducing a load of the HLR.

Figure 8:
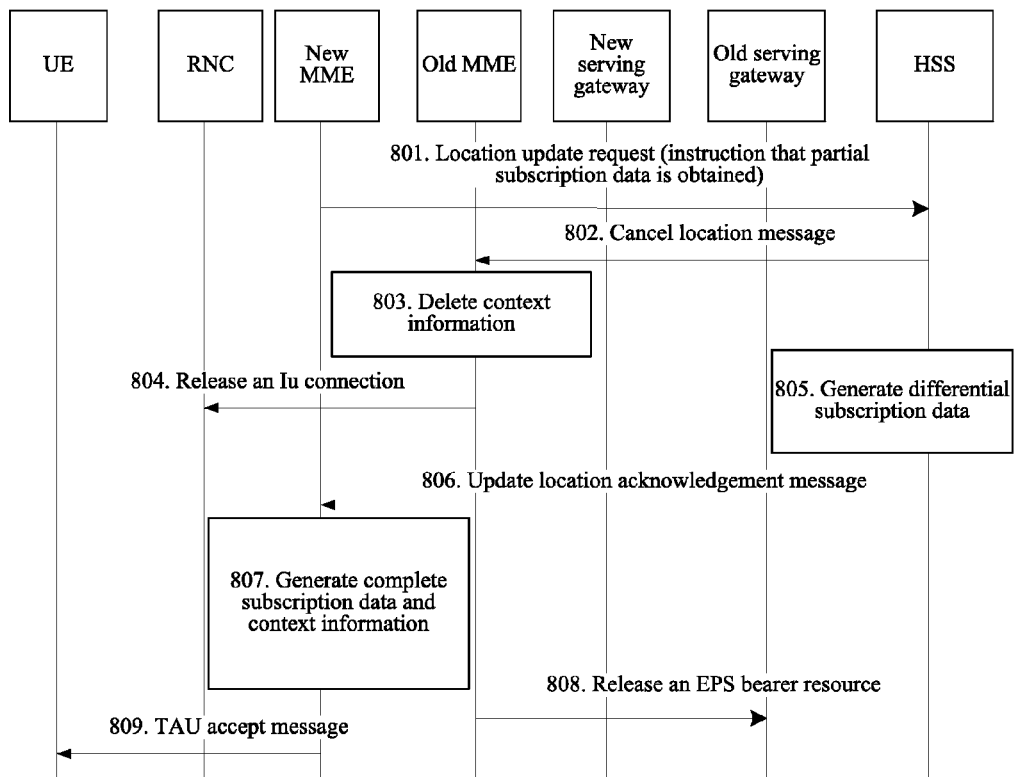
FIG. 8 is a signaling diagram of an eighth embodiment of a location update processing method of the present invention.

FIG. 8 is a signaling diagram of an eighth embodiment of a location update processing method of the present invention. As shown in FIG. 8, the method includes the following steps.

Step 801: A new MME initiates a location update request to an HSS, where the location update request message carries an instruction that partial subscription data is currently obtained.

In this embodiment, that the UE performs an inter-MME location update is used for illustration, and this embodiment is based on the embodiments shown in FIG. 5 and FIG. 6.

Before step 801, this embodiment may further include step 401 to step 408 in the embodiment shown in FIG. 4. The partial subscription data obtained in step 801 refers to the context information sent by the old MME in step 405.

It should be noted that the location update request message in step 801 carries an instruction. It should be noted that if the new MME and the HSS are in the same network, the HSS may have known that the new MME supports the enhancement function in this embodiment, and the instruction information may also not be sent. If the UE is in a roaming state, that is, the new MME and the HSS are in different networks, the instruction information has to be sent.

Step 802: The HSS sends a cancel location message to an old MME.

Step 803: The old MME deletes context information (MM context and EPS bearer context).

Step 804: The old MME releases an Iu connection between the old MME and an old RNC.

Step 805: The HSS determines, according to the instruction information provided by the new MME in step 801, whether the new MME has acquired partial subscription data, and if yes, generates differential subscription data (that is, subscription data other than subscription data obtained by the new MME).

Step 806: The HSS sends an update location acknowledgement (Update Location Ack) message to the new MME, where the message includes the differential subscription data of the UE.

Step 807: The new MME generates complete subscription data and context information (MM context and EPS Bearer Context) according to subscription data obtained from the old MME and subscription data obtained from the HSS.

Step 808: The old MME releases an EPS bearer resource between the old MME and an old serving gateway.

Step 809: The MME sends a TAU accept message to the UE.

In this embodiment, at the time of performing a location update, the new MME may obtain partial subscription data from the old MME, and therefore the HSS is only required to send differential subscription data to the new MME and is not required to send the complete subscription data, thereby reducing the amount of data sent by the HSS and reducing a load of the HSS.

Figure 9:
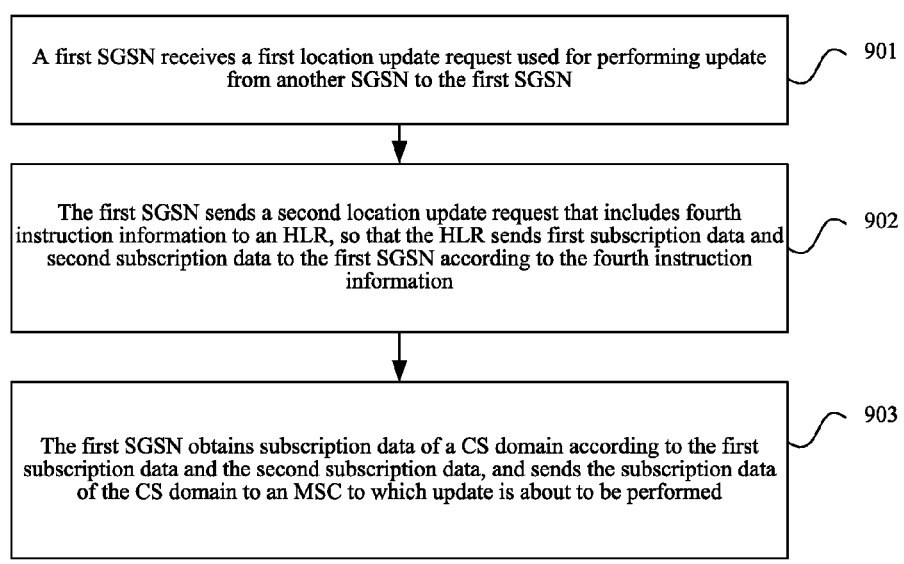
FIG. 9 is a flow chart of a ninth embodiment of a location update processing method of the present invention.

FIG. 9 is a flow chart of a ninth embodiment of a location update processing method of the present invention. As shown in FIG. 9, the method includes the following steps.

Step 901: A first SGSN receives a first location update request used for performing an update from another SGSN to the first SGSN.

An embodiment of the present invention may be applied to a scenario that a UE performs a location update in a 2G network or 3G network or between a 2G network and a 3G network, where a location update between SGSNs and a location update between MSCs may be included.

The first SGSN is an SGSN which the UE enters.

Step 902: The first SGSN sends a second location update request that includes fourth instruction information to an HLR, so that the HLR sends first subscription data and second subscription data to the first SGSN according to the fourth instruction information, where the first subscription data is subscription data of a PS domain, and the second subscription data is subscription data of a CS domain other than common subscription data of the PS domain and the CS domain.

After receiving the location update request, the first SGSN sends the fourth instruction information to the HLR, and the fourth instruction information may denote that the first SGSN supports joint location update. That is, the HLR may send both the first subscription data and the second subscription data to the first SGSN.

Step 903: The first SGSN obtains subscription data of the CS domain according to the first subscription data and the second subscription data and sends the subscription data of the CS domain to an MSC to which an update is about to be performed.

After being handed over to the first SGSN, the UE performs corresponding CS domain location update, and therefore is required to enter a new MSC, that is, the MSC to which an update is about to be performed.

After receiving the first subscription data and the second subscription data that are sent by the HLR, the first SGSN selects the common subscription data of the PS domain and the CS domain from the first subscription data, then combines the common subscription data and the second subscription data into the subscription data of the CS domain, and then sends the subscription data of the CS domain to the MSC to which an update is about to be performed. Therefore, it may be avoided that the HLR sends the subscription data of the CS domain again to the MSC to which an update is about to be performed, so the number of times the HLR sends data may be reduced and a load of the HLR may be reduced.

In an embodiment of the present invention, in a process that the UE performs the update from another SGSN to the first SGSN, the first SGSN sends the instruction information to the HLR after receiving the location update request, so that the HLR sends both the subscription data of the PS domain and the subscription data of the CS domain to the first SGSN. Then, the first SGSN sends the subscription data of the CS domain to the MSC to which an update is about to be performed. Therefore, the HLR is not required to send the subscription data of the CS domain again to the MSC to which an update is about to be performed, thereby reducing the amount of data sent by the HLR and reducing the load of the HLR.

Figure 10:
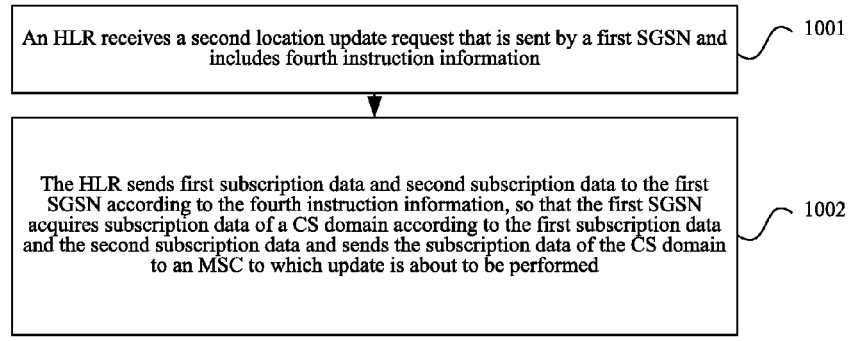
FIG. 10 is a flow chart of a tenth embodiment of a location update processing method of the present invention.

FIG. 10 is a flow chart of a tenth embodiment of a location update processing method of the present invention. As shown in FIG. 10, the method includes the following steps.

Step 1001: An HLR receives a second location update request that is sent by a first SGSN and includes fourth instruction information. The second location update request is sent by the first SGSN after receiving a first location update request used for performing an update from another SGSN to the first SGSN.

This embodiment corresponds to the embodiment shown in FIG. 9, and is applied to the same scenario. Referring to the specific description in step 901 and step 902, after receiving the first location update request, the first SGSN sends the fourth instruction information to the HLR, and the fourth instruction information may denote that the first SGSN supports joint location update, that is, the HLR may send both first subscription data and second subscription data to the first SGSN.

Step 1002: The HLR sends the first subscription data and the second subscription data to the first SGSN according to the fourth instruction information, so that the first SGSN acquires subscription data of a CS domain according to the first subscription data and the second subscription data and sends the subscription data of the CS domain to an MSC to which an update is about to be performed, The first subscription data is subscription data of a PS domain, and the second subscription data is subscription data of the CS domain other than common subscription data of the PS domain and the CS domain.

The HLR sends the first subscription data and the second subscription data to the first SGSN according to a received instruction, for example, sends the first subscription data and the second subscription data to the first SGSN through an insert subscriber data message. Then, the first SGSN acquires common subscription data of the CS domain and the PS domain from the first subscription data, then combines the common subscription data and the second subscription data to form the subscription data of the CS domain and sends the subscription data of the CS domain to a new MSC, that is, the MSC to which an update is about to be performed.

In an embodiment of the present invention, in a process that the UE performs the update from another SGSN to the first SGSN, the first SGSN sends the instruction information to the HLR after receiving the location update request. Then the HLR sends both the subscription data of the PS domain and the subscription data of the CS domain to the first SGSN, and the first SGSN sends the subscription data of the CS domain to the MSC to which an update is about to be performed, so that the HLR is not required to send the subscription data of the CS domain again to the MSC to which an update is about to be performed, thereby reducing the amount of data sent by the HLR and reducing a load of the HLR.

Figure 11:
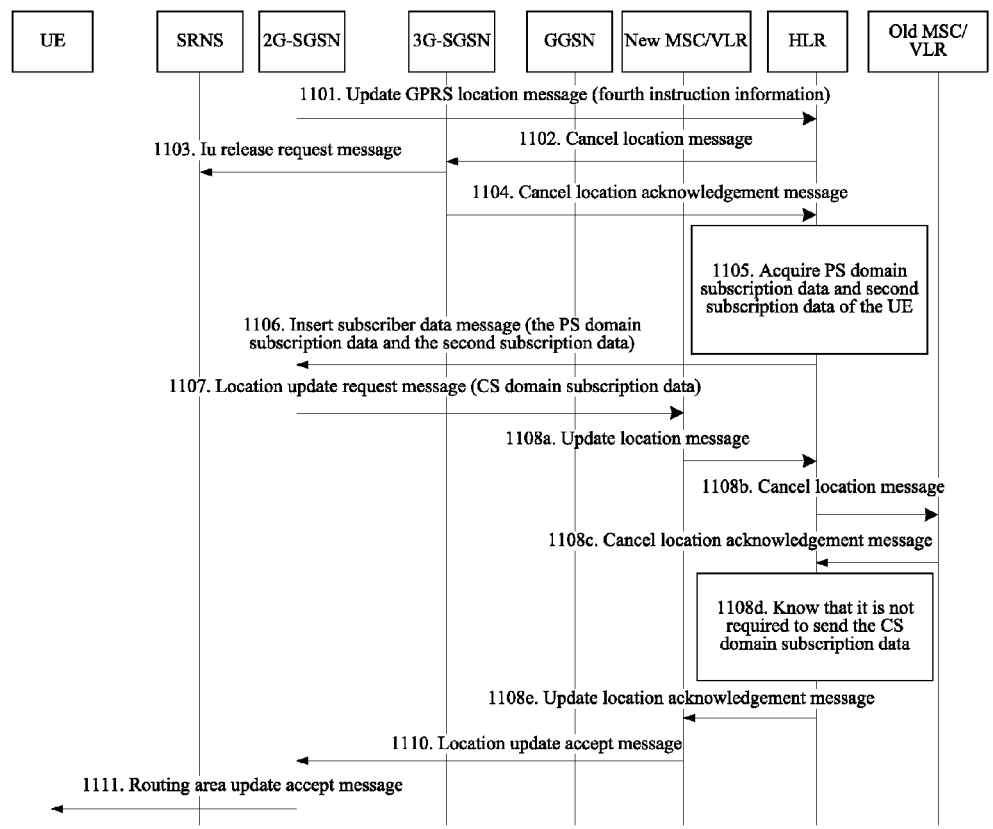
FIG. 11 is a signaling diagram of an eleventh embodiment of a location update processing method of the present invention.

FIG. 11 is a signaling diagram of an eleventh embodiment of a location update processing method of the present invention. As shown in FIG. 11, the method includes the following steps.

Step 1101: A 2G-SGSN sends an update GPRS location (Update GPRS Location) message to an HLR, where the message may carry an SGSN Number, an SGSN Address, an IMSI and fourth instruction information.

In this embodiment, update from a 3G network to a 2G network is taken as an example for illustration, and other update processes are similar to the process described in this embodiment. This embodiment is based on the embodiments shown in FIG. 9 and FIG. 10. Before step 1101, this embodiment may include step 301 to step 310 in the embodiment shown in FIG. 3A and FIG. 3B, which are not described again.

The fourth instruction information may aim to inform the HLR that the 2G-SGSN supports an enhancement function in this embodiment, that is, the 2G-SGSN may acquire the subscription data of the CS domain from the subscription data of the PS domain and the subscription data of the CS domain that are subsequently sent by the HLR and send the subscription data of the CS domain to a new MSC.

It should be noted that if the 2G-SGSN and the HLR are in the same network, the HLR may have known that the 2G-SGSN supports the enhancement function in this embodiment, and the fourth instruction information may also not be sent. If the UE is in the roaming state, that is, the 2G-SGSN and the HLR are in different networks, the fourth instruction information has to be sent.

Step 1102: The HLR sends a cancel location (Cancel Location) message to the 3G-SGSN, to inform the 3G-SGSN of deleting an MM context and a PDP context.

Step 1103: If the UE is currently transmitting data, the 3G-SGSN sends an Iu release request message to the SRNS, so as to release a connection between the 3G-SGSN and the SRNS.

Step 1104: The 3G-SGSN returns a cancel location acknowledgement message to the HLR.

Step 1105: The HLR acquires the PS domain subscription data and second subscription data of the UE according to the instruction information provided by the 2G-SGSN in step 1101, where the second subscription data is CS domain subscription data other than the common subscription data of the PS domain and the CS domain.

Step 1106: The HLR sends an insert subscriber data (Insert Subscriber Data) message to the 2G-SGSN, where the message includes the PS domain subscription data and the second subscription data.

Step 1107: The 2G-SGSN acquires the CS domain subscription data according to the acquired PS domain subscription data and second subscription data, and sends the CS domain subscription data to a 2G-MSC through a location update request (Location Update Request) message.

The 2G-SGSN has already sent the CS domain subscription data to the 2G-MSC, so in a subsequent CS domain update procedure, the HLR is not required to send the CS domain subscription data to the 2G-MSC again.

The following is a CS domain update processing process.

Step 1108*a*: A new MSC/VLR sends an update location (Update Location) message to the HLR.

Step 1108*b*: The HLR sends a cancel location (Cancel Location) message to an old MSC/VLR to inform the old MSC/VLR of deleting the subscription data of the UE.

Step 1108*c*: The old MSC/VLR replies to the HLR with a cancel location acknowledgement message.

Step 1108*d*: The HLR knows, according to the instruction information provided by the 2G-SGSN in step 1101, that it is not required to send the CS domain subscription data to the new MSC/VLR.

Step 1108*e*: The HLR sends an update location acknowledgement (Update Location Ack) message to the new MSC/VLR.

Step 1109: The new MSC/VLR sends a location update accept (Location Update Accept) message to the 2G-SGSN.

Step 1110: The 2G-SGSN returns a routing area update accept (Routing Area Update Accept) message to the UE, and then a subsequent step is performed according to an existing procedure.

In this embodiment, in a location update process, the HLR sends both the subscription data of the PS domain and the subscription data of the CS domain to a new SGSN (that is, the 2G-SGSN) according to an instruction of the new SGSN, and the new SGSN sends the subscription data of the CS domain to a new MSC (that is, the 2G-MSC), so that the HLR is not required to send the subscription data of the CS domain again to the new MSC, thereby reducing the amount of data sent by the HLR and reducing a load of the HLR.

Persons of ordinary skill in the art may understand that all or part of the steps of the methods in the described embodiments may be implemented by a computer program instructing relevant hardware. The program may be stored in a computer readable storage medium. When the program is run, the steps of the method in an embodiment are performed. The storage medium includes various mediums capable of storing program code, such as a ROM, a RAM, a magnetic disk or an optical disk.

Figure 12:
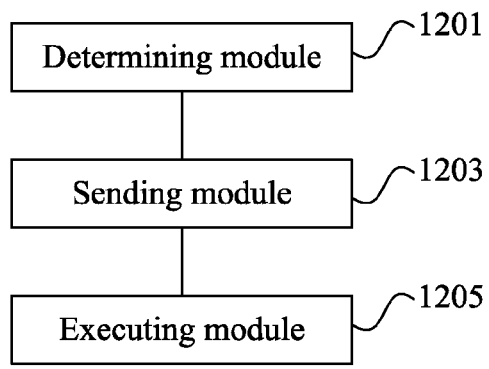
FIG. 12 is a schematic diagram of a first embodiment of a first core network device of the present invention.

FIG. 12 is a schematic diagram of a first embodiment of a first core network device of the present invention. As shown in FIG. 12, the first core network device includes a determining module 1201, a sending module 1203 and an executing module 1205.

The determining module 1201 is configured to, when a UE enters the first core network device and performs a location update, determine whether context information of the UE is available at least according to whether a timer times out, where the timer is sent to the first core network device by a second core network device before the UE enters the first core network device and when the UE leaves the first core network device and performs a location update. In the alternative, the timer is saved in the first core network device in advance.

The sending module 1203 is configured to, when the determining module 1201 determines the context information of the UE is available at least according to that the timer does not time out, send, to the second core network device, a location update request that at least includes information that the context information of the UE is available.

The executing module 1205 is configured to execute a location update at least according to saved context information of the UE.

Reference is made to the description in the method embodiment shown in FIG. 1 for the working procedure and the working principle of each module in this embodiment, which are not described again. The first core network device provided in this embodiment is configured to implement the method embodiment shown in FIG. 1.

In an embodiment of the present invention, when the UE enters the first core network device and performs the location update, and after the determining module determines that the context information of the UE is available according to that the timer that is sent by the second core network device or saved in advance does not time out, the first core network device may execute a location update according to the saved context information of the UE. Therefore the sending module of the first core network device sends, to the second core network device, the location update request that at least includes the information that the context information of the UE is available, so that the second core network device is not required to send subscription data of the UE to the first core network device anymore, thereby reducing the amount of data sent by the second core network device and reducing a load of the second core network device.

Figure 13:
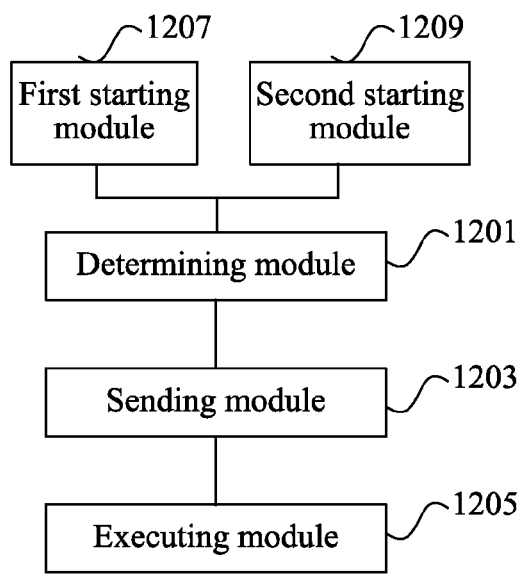
FIG. 13 is a schematic diagram of a second embodiment of a first core network device of the present invention.

FIG. 13 is a schematic diagram of a second embodiment of a first core network device of the present invention. On the basis of what is shown in FIG. 12, as shown in FIG. 13, the first core network device further includes at least one of the following modules: a first starting module 1207 and a second starting module 1209.

The first starting module 1207 is configured to, when the timer is sent to the first core network device by the second core network device, start the timer at the same time when the first core network device receives the timer or after the first core network device receives the timer.

The second starting module 1209 is configured to, when the timer is saved in the first core network device in advance, start the timer at the same time when or after the first core network device receives instruction information sent by the second core network device.

The first core network device is an SGSN, and the second core network device is an HLR. Alternatively, the first core network device is an MSC, and the second core network device is an HLR. In another alternative, the first core network device is an MME, and the second core network device is an HSS.

Reference is made to the description in the method embodiments shown in FIG. 1 to FIG. 4 for the working procedure and the working principle of each module in this embodiment, which are not described again. The first core network device provided in this embodiment is configured to implement the method embodiments shown in FIG. 1 to FIG. 4.

In an embodiment of the present invention, when the UE leaves the first core network device and performs the location update, time for saving the context information of the UE in the first core network device is prolonged. When the UE frequently executes a location update (such as LAU/RAU/TAU), the first core network device does not delete the context information of the UE immediately, but reserves the context information of the UE for a period of time, so when the UE is handed back over, it is not required to download subscription data from the second core network device again, thereby reducing the amount of data sent by the second core network device and reducing a load of the second core network device.

Figure 14:
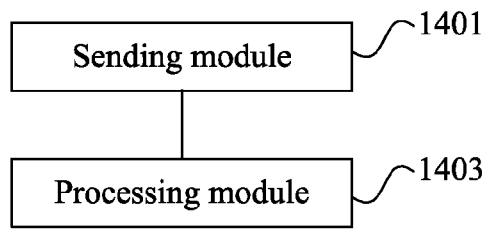
FIG. 14 is a schematic diagram of a first embodiment of a second core network device of the present invention.

FIG. 14 is a schematic diagram of a first embodiment of a second core network device of the present invention. As shown in FIG. 14, the second core network device includes a sending module 1401 and a processing module 1403.

The sending module 1401 is configured to, when a UE leaves a first core network device and performs a location update, send, to the first core network device, a timer or instruction information used for starting a timer, so that when the first core network device determines, when the UE enters the first core network device again and performs a location update, that context information of the UE is available at least according to that the timer does not time out, the first core network device sends, to the second core network device, a location update request that at least includes information that the context information of the UE is available, and executes a location update at least according to saved context information of the UE.

The processing module 1403 is configured not to send subscription data of the UE to the first core network device, at least according to the information that the context information of the UE is available and that is included in the received location update request.

Reference is made to the description in the method embodiment shown in FIG. 2 for the working procedure and the working principle of each module in this embodiment, which are not described again. The second core network device provided in this embodiment is configured to implement the method embodiment shown in FIG. 2.

In an embodiment of the present invention, when the UE leaves the first core network device and performs the location update, the sending module of the second core network device sends, to the first core network device, the timer or the instruction information used for starting a timer, so that the first core network device does not delete the context information of the UE before the timer times out. Then, when the UE enters the first core network device again, the first core network device first determines whether the first timer times out, and if not timed out, the first core network device notifies the second core network device of information that the first timer does not time out, so that the processing module of the second core network device is not required to send the subscription data of the UE to the first core network device again, thereby reducing the amount of data sent by the second core network device and reducing a load of the second core network device.

Figure 15:
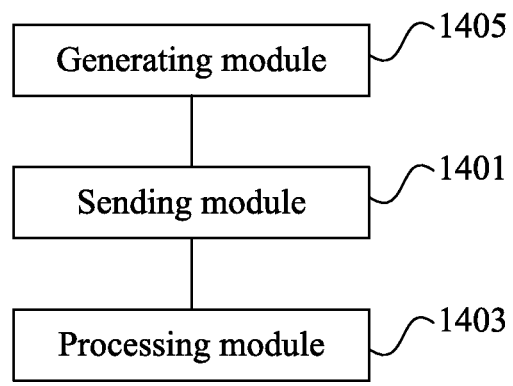
FIG. 15 is a schematic diagram of a second embodiment of a second core network device of the present invention.

FIG. 15 is a schematic diagram of a second embodiment of a second core network device of the present invention. On the basis of the embodiment shown in FIG. 14, as shown in FIG. 15, optionally, the second core network device further includes a generating module 1405.

The generating module 1405 is configured to generate, at least according to a network state and/or a load state of the second core network device, the timer or the instruction information used for starting a timer.

Further, the processing module 1403 may specifically be configured such that the second core network device does not send subscription data of the UE to the first core network device according to the information that the context information of the UE is available and that is included in the received location update request, and according to that the second core network device determines that the timer does not time out.

Alternatively, further, the processing module 1403 may specifically be configured such that the second core network device does not send subscription data of the UE to the first core network device according to the information that the context information of the UE is available and that is included in the received location update request, and according to that the second core network device determines that subscription data of the UE saved in the second core network device is the latest.

The first core network device is an SGSN, and the second core network device is an HLR. Alternatively, the first core network device is an MSC, and the second core network device is an HLR. In the alternative, the first core network device is an MME, and the second core network device is an HSS.

Reference is made to the description in the method embodiments shown in FIG. 1 to FIG. 4 for the working procedure and the working principle of each module in this embodiment, which are not described again. The second core network device provided in this embodiment is configured to implement the method embodiments shown in FIG. 1 to FIG. 4.

In an embodiment of the present invention, when the UE leaves the first core network device and performs the location update, the second core network device notifies the first core network device of prolonging time for saving the context information of the UE in the first core network device. When the UE frequently executes a location update (such as LAU/RAU/TAU), the first core network device does not delete the context information of the UE immediately, but reserves the context information of the UE for a period of time, so when the UE is handed back over, it is not required to download the subscription data from the second core network device again, thereby reducing the amount of data sent by the second core network device and reducing a load of the second core network device.

An embodiment of the present invention further provides a location update processing system, including the first core network device shown in FIG. 12 or FIG. 13 and the second core network device shown in FIG. 14 or FIG. 15. Reference is made to the specific description in the embodiments shown in FIG. 1 to FIG. 4 for the working procedures, the working principles and the beneficial effects of the first core network device and the second core network device, which are not described again.

Figure 16:
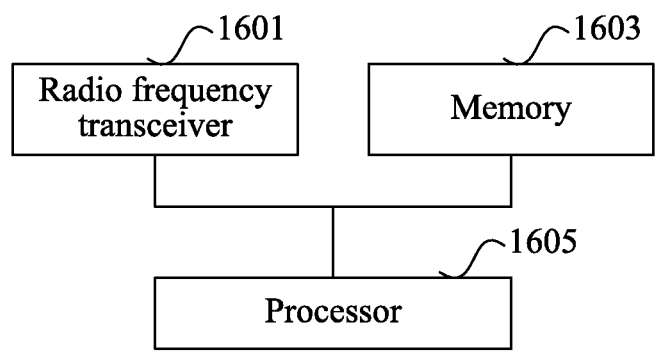
FIG. 16 is a schematic diagram of a third embodiment of a first core network device of the present invention.

FIG. 16 is a schematic diagram of a third embodiment of a first core network device of the present invention. As shown in FIG. 16, the first core network device includes a radio frequency transceiver 1601, a memory 1603 and at least one processor 1605.

The processor 1605 is coupled to the radio frequency transceiver 1601 and the memory 1603. The processor 1605 is configured to, when a UE enters the first core network device and performs a location update, and when it is determined that context information of the UE is available at least according to that a timer does not time out, trigger the radio frequency transceiver to send, to a second core network device, a location update request that at least includes information that the context information of the UE is available and execute a location update at least according to context information of the UE saved in the memory.

The timer is sent to the first core network device by the second core network device before the UE enters the first core network device and when the UE leaves the first core network device and performs a location update. Alternatively, the timer is saved in the first core network device in advance.

Further, in another implementation manner, the processor 1605 is configured to, when the timer is sent to the first core network device by the second core network, start the timer at the same time when the first core network device receives the timer or after the first core network device receives the timer. Alternatively, the processor 1605 is configured to, when the timer is saved in the first core network device in advance, start the timer at the same time when or after the first core network device receives instruction information sent by the second core network device.

The first core network device is an SGSN, and the second core network device is an HLR. Alternatively, the first core network device is an MSC, and the second core network device is an HLR. In the alternative, the first core network device is an MME, and the second core network device is an HSS.

The first core network device provided in this embodiment is configured to implement the method embodiments shown in FIG. 1 to FIG. 4. Reference is made to the description in the method embodiments shown in FIG. 1 to FIG. 4 for the working procedure and the working principle of the first core network device in this embodiment, which are not described again.

In an embodiment of the present invention, when the UE leaves the first core network device and performs a location update, the time for saving the context information of the UE in the first core network device is prolonged. When the UE frequently executes a location update (such as LAU/RAU/TAU), the first core network device does not delete the context information of the UE immediately, but reserves the context information of the UE for a period of time, so when the UE is handed back over, it is not required to download subscription data from the second core network device again, thereby reducing the amount of data sent by the second core network device and reducing a load of the second core network device.

Figure 17:
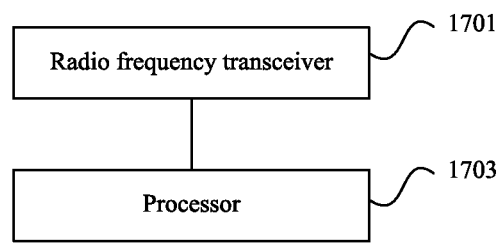
FIG. 17 is a schematic diagram of a third embodiment of a second core network device of the present invention.

FIG. 17 is a schematic diagram of a third embodiment of a second core network device of the present invention. As shown in FIG. 17, the second core network device includes a radio frequency transceiver 1701 and at least one processor 1703, and the processor 1703 is coupled to the radio frequency transceiver 1701.

The radio frequency transceiver 1701 is configured to, when a UE leaves a first core network device and performs a location update, send, to the first core network device, a timer or instruction information used for starting a timer, so that when the first core network device determines, when the UE enters the first core network device again and performs a location update, that context information of the UE is available at least according to that the timer does not time out, the first core network device sends, to the second core network device, a location update request that at least includes information that the context information of the UE is available, and executes a location update at least according to saved context information of the UE.

The processor 1703 is configured not to send subscription data of the UE to the first core network device, at least according to the information that the context information of the UE is available and that is included in the received location update request.

Further, in another implementation manner, the processor 1703 is configured to generate, at least according to a network state and/or a load state of the second core network device, the timer or the instruction information used for starting a timer.

Further, in another implementation manner, the processor 1703 is specifically configured not to send subscription data of the UE to the first core network device according to the information that the context information of the UE is available and that is included in the received location update request, and according to that it is determined that the timer does not time out.

Further, in another implementation manner, the second core network device further includes: a memory (not shown in FIG. 17) coupled to the processor 1703, and the memory is configured to at least store the subscription data of the UE. The processor 1703 is specifically configured not to send subscription data of the UE to the first core network device according to the information that the context information of the UE is available and that is included in the received location update request, and according to that it is determined that the subscription data of the UE saved in the memory is the latest.

The first core network device is an SGSN, and the second core network device is an HLR. Alternatively, the first core network device is an MSC, and the second core network device is an HLR. In the alternative, the first core network device is an MME, and the second core network device is an HSS.

The second core network device provided in this embodiment is configured to implement the method embodiments shown in FIG. 1 to FIG. 4. Reference is made to the description in the method embodiments shown in FIG. 1 to FIG. 4 for the working procedure and the working principle of the second core network device in this embodiment, which are not described again.

In an embodiment of the present invention, when the UE leaves the first core network device and performs the location update, the second core network device prolongs time for saving the context information of the UE in the first core network device. When the UE frequently executes a location update, the first core network device does not delete the context information of the UE immediately, but reserves the context information of the UE for a period of time, so when the UE is handed back over, it is not required to download subscription data from the second core network device again, thereby reducing the amount of data sent by the second core network device and reducing a load of the second core network device.

An embodiment of the present invention further provides a location update processing system, including the first core network device described in FIG. 16 and the second core network device described in FIG. 17. Reference is made to the specific description in the embodiments shown in FIG. 1 to FIG. 4 for the working procedures, the working principles and the beneficial effects of the first core network device and the second core network device, which are not described again.

Finally, it should be noted that the foregoing embodiments are merely used for describing the technical solutions of the present invention, rather than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof; and such modifications or replacements do not make the essence of corresponding technical solutions depart from the scope of the technical solution of embodiments of the present invention.

What is claimed is:

1. A location update processing method, the method comprising:
    when a user equipment (UE) leaves a first core network device and performs a first location update, sending, by a second core network device, a timer or instruction information used for starting a timer to the first core network device so that, when the UE enters the first core network device again and performs a second location update, the first core network device determines that context information of the UE is available when the timer has not timed out;
    receiving, by the second core network device, a location update request that at least comprises information that the context information of the UE is available sent from first core network device, wherein the available context information of the UE is used by the first core network device to execute the second location update; and
    not sending, by the second core network device, subscription data of the UE to the first core network device, at least when the location update request comprises the information that the context information of the UE is available.

2. The method according to claim 1, wherein the timer or the instruction information used for starting the timer is generated by the second core network device at least according to a network state a load state of the second core network device, or both.

3. The method according to claim 1, wherein the not sending, by the second core network device, the subscription data of the UE to the first core network device comprises:
    not sending, by the second core network device, the subscription data of the UE to the first core network device at least when the location update request comprises the information that the context information of the UE is available and when the second core network device determines that the timer has not timed out.

4. The method according to claim 1, wherein the not sending, by the second core network device, the subscription data of the UE to the first core network device comprises:
    not sending, by the second core network device, the subscription data of the UE to the first core network device when the location update request comprises the information that the context information of the UE is available and when the second core network device determines that the subscription data of the UE saved in the second core network device is the latest subscription data.

5. The method according to claim 4, wherein the determination by the second core network device that the subscription data of the UE saved in the second core network device is the latest subscription data comprises using acquisition time information of the subscription data of the UE comprised in the location update request.

6. The method according to claim 1, wherein:
    the first core network device is a Serving GPRS Support Node (SGSN) and the second core network device is a Home Location Register (HLR); or
    the first core network device is a Mobile Switching Centre (MSC) and the second core network device is an HLR; or
    the first core network device is a Mobility Management Entity (MME) and the second core network device is a Home Subscriber Server (HSS).

7. A core network device, comprising:
    a radio frequency transceiver; and
    at least one processor, wherein the processor is coupled to the radio frequency transceiver;
    wherein the radio frequency transceiver is configured to, when a user equipment (UE) leaves a further core network device and performs a location update, send a timer or instruction information used for starting a timer to the further core network device, so that when the UE reenters the further core network device and performs a second location update, the further core network device determines that context information of the UE is available at least when the timer has not timed out, and the further core network device sends to the core network device a location update request that at least comprises information that the context information of the UE is available and executes the second location update at least according to saved context information of the UE; and
    wherein the at least one processor is configured not to send subscription data of the UE to the further core network device when the location update request comprises the information that the context information of the UE is available.

8. The core network device according to claim 7, wherein the at least one processor is configured to generate, at least according to a network state and/or a load state of the core network device, the timer or the instruction information used for starting the timer.

9. The core network device according to claim 7, wherein the at least one processor is configured not to send the subscription data of the UE to the further core network device when the location update request comprises the information that the context information of the UE is available and when it is determined that the timer has not timed out.

10. The core network device according to claim 7, further comprising:
a memory coupled to the at least one processor, wherein the memory is configured to at least store the subscription data of the UE, and wherein the at least one processor is configured not to send the subscription data of the UE to the further core network device when the location update request comprises the information that the context information of the UE is available and when it is determined that the subscription data of the UE saved in the memory is the latest subscription data.

11. The core network device according to claim 7, wherein:
the further core network device is a Serving GPRS Support Node (SGSN) and the core network device is a Home Location Register (HLR); or
the further core network device is a Mobile Switching Centre (MSC) and the core network device is an HLR; or
the further core network device is a Mobility Management Entity (MME) and the core network device is a Home Subscriber Server (HSS).

12. A location update processing method, the method comprising:
receiving, by a first core network device, a timer or instruction information used for starting a timer, sent by a second core network device when a UE leaves the first core network device and performs a first location update;
determining, by the first core network device, that context information of the UE is available if the timer has not timed out when the UE enters the first core network device again and performs a second location update;
sending, by the first core network device, a location update request that comprises information that the context information of the UE is available to the second core network device; and
executing, by the first core network device, the second location update at according to saved context information of the UE.

13. The method according to claim 12, wherein the location update request further comprises an acquisition time of current subscription data of the UE in the first core network device.

14. The method according to claim 12, wherein
the first core network device is a Serving GPRS Support Node (SGSN) and the second core network device is a Home Location Register (HLR); or
the first core network device is a Mobile Switching Centre (MSC) and the second core network device is an HLR; or
the first core network device is a Mobility Management Entity (MME) and the second core network device is a Home Subscriber Server (HSS).

15. A first core network device, comprising:
a radio frequency transceiver; and
at processor, wherein the processor is coupled to the radio frequency transceiver;
wherein the radio frequency transceiver is configured to receive a timer or instruction information used for starting a timer sent by a second core network device when a UE leaves the first core network device and performs a first location update;
the processor is configured to determine that context information of the UE is available if the timer has not timed out when the UE enters the first core network device again and performs a second location update;
the radio frequency transceiver is further configured to send a location update request that includes information that the context information of the UE is available to the second core network device;
the processor is further configured to execute a location update according to saved context information of the UE.

16. The core network device according to claim 15, wherein the location update request further comprises an acquisition time of current subscription data of the UE in the first core network device.

17. The core network device according to claim 15, wherein
the first core network device is a Serving GPRS Support Node (SGSN) and the second core network device is a Home Location Register (HLR); or
the first core network device is a Mobile Switching Centre (MSC) and the second core network device is an HLR; or
the first core network device is a Mobility Management Entity (MME) and the second core network device is a Home Subscriber Server (HSS).

* * * * *